(12) United States Patent
Jevans et al.

(10) Patent No.: US 11,888,892 B2
(45) Date of Patent: *Jan. 30, 2024

(54) CRYPTOCURRENCY BASED MALWARE AND RANSOMWARE DETECTION SYSTEMS AND METHODS

(71) Applicant: CipherTrace, Inc., Purchase, NY (US)

(72) Inventors: David Jevans, Menlo Park, CA (US); Rudi Cilibrasi, Los Gatos, CA (US)

(73) Assignee: CipherTrace, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,460

(22) Filed: Dec. 3, 2022

(65) Prior Publication Data

US 2023/0095875 A1 Mar. 30, 2023

Related U.S. Application Data

(63) Continuation of application No. 16/685,928, filed on Nov. 15, 2019, now Pat. No. 11,546,373.

(Continued)

(51) Int. Cl.
*H04L 29/06* (2006.01)
*H04L 9/40* (2022.01)
(Continued)

(52) U.S. Cl.
CPC .......... *H04L 63/145* (2013.01); *G06F 16/955* (2019.01); *G06Q 20/102* (2013.01); *H04L 63/1416* (2013.01); *H04L 63/1425* (2013.01)

(58) Field of Classification Search
CPC ............... H04L 63/145; H04L 63/1416; H04L 63/1425; H04L 9/50; H04L 63/0428;
(Continued)

(56) References Cited

U.S. PATENT DOCUMENTS

| 9,298,806 | B1 | 3/2016 | Vessenes et al. |
| 9,635,000 | B1 | 4/2017 | Muftic |

(Continued)

FOREIGN PATENT DOCUMENTS

| CN | 104320262 A | 1/2015 |
| EP | 3884411 A1 | 9/2021 |

(Continued)

OTHER PUBLICATIONS

Biryukov et al., "Deanonymisation of clients in Bitcoin P2P network", Jul. 5, 2014, Retrieved from the internet: https://arxiv.org/abs/1405. 74 183> on May 25, 2021, 15 pages.

(Continued)

*Primary Examiner* — Harunur Rashid
(74) *Attorney, Agent, or Firm* — Barta, Jones & Foley, PLLC

(57) ABSTRACT

Cryptocurrency based malware and ransomware detection systems and methods are disclosed herein. An example method includes analyzing a plurality of malware or ransomware attacks to determine cryptocurrency payment address of malware or ransomware attacks, building a malware or ransomware attack database with the cryptocurrency payment addresses of the plurality of malware or ransomware attacks, identifying a proposed cryptocurrency transaction that includes an address that is included in the malware or ransomware attack database, and denying the proposed cryptocurrency transaction.

20 Claims, 17 Drawing Sheets

Related U.S. Application Data

(60) Provisional application No. 62/770,113, filed on Nov. 20, 2018, provisional application No. 62/770,109, filed on Nov. 20, 2018.

(51) Int. Cl.
  *G06F 16/955* (2019.01)
  *G06Q 20/10* (2012.01)

(58) Field of Classification Search
  CPC .... G06F 16/955; G06F 21/554; G06F 21/563; G06F 21/56; G06Q 20/102; G06Q 2220/00; G06Q 20/02; G06Q 20/065; G06Q 20/4016; G06Q 20/06; G06Q 20/40; G06N 20/00
  See application file for complete search history.

(56) References Cited

U.S. PATENT DOCUMENTS

| | | | |
|---|---|---|---|
| 10,102,265 | B1 | 10/2018 | Madisetti et al. |
| 10,171,476 | B2 | 1/2019 | Khan |
| 10,891,694 | B1 | 1/2021 | Leise et al. |
| 10,944,778 | B1* | 3/2021 | Golan ............... H04L 63/1491 |
| 11,206,137 | B2 | 12/2021 | Yu et al. |
| 2006/0184528 | A1 | 8/2006 | Rodeh |
| 2006/0248016 | A1 | 11/2006 | Ginter et al. |
| 2011/0251951 | A1 | 10/2011 | Kolkowitz et al. |
| 2012/0130853 | A1 | 5/2012 | Petri et al. |
| 2013/0018796 | A1 | 1/2013 | Kolhatkar et al. |
| 2014/0047544 | A1 | 2/2014 | Jakobsson |
| 2015/0032625 | A1 | 1/2015 | Dill et al. |
| 2015/0318995 | A1 | 11/2015 | Leggette et al. |
| 2015/0332283 | A1 | 11/2015 | Witchey |
| 2015/0363769 | A1 | 12/2015 | Ronca et al. |
| 2015/0381637 | A1* | 12/2015 | Raff .................. H04L 63/0218 726/23 |
| 2016/0012465 | A1 | 1/2016 | Sharp |
| 2016/0071108 | A1 | 3/2016 | Caldera et al. |
| 2016/0162886 | A1* | 6/2016 | Howe ............... G06Q 20/382 705/44 |
| 2016/0217436 | A1 | 7/2016 | Brama |
| 2016/0261690 | A1 | 9/2016 | Ford |
| 2016/0283920 | A1 | 9/2016 | Fisher et al. |
| 2016/0283941 | A1 | 9/2016 | Andrade |
| 2016/0300227 | A1* | 10/2016 | Subhedar ............. G06Q 20/384 |
| 2016/0300234 | A1 | 10/2016 | Moss-Pultz et al. |
| 2016/0328742 | A1 | 11/2016 | Shiravi Khozani et al. |
| 2016/0330027 | A1 | 11/2016 | Ebrahimi |
| 2016/0342994 | A1 | 11/2016 | Davis |
| 2017/0005804 | A1 | 1/2017 | Zinder |
| 2017/0011460 | A1 | 1/2017 | Molinari et al. |
| 2017/0031676 | A1 | 2/2017 | Cecchetti et al. |
| 2017/0034189 | A1* | 2/2017 | Powell ................. H04L 63/145 |
| 2017/0034197 | A1 | 2/2017 | Daniel et al. |
| 2017/0093830 | A1 | 3/2017 | Wuehler |
| 2017/0111175 | A1 | 4/2017 | Oberhauser et al. |
| 2017/0132620 | A1 | 5/2017 | Miller et al. |
| 2017/0132635 | A1* | 5/2017 | Caldera ............... G06Q 20/381 |
| 2017/0132636 | A1 | 5/2017 | Caldera |
| 2017/0206604 | A1 | 7/2017 | Al-Masoud |
| 2017/0214701 | A1 | 7/2017 | Hasan |
| 2017/0236094 | A1 | 8/2017 | Shah |
| 2017/0250972 | A1 | 8/2017 | Ronda et al. |
| 2017/0270534 | A1 | 9/2017 | Zoldi et al. |
| 2017/0293669 | A1 | 10/2017 | Madhavan et al. |
| 2017/0316390 | A1 | 11/2017 | Smith et al. |
| 2017/0330180 | A1 | 11/2017 | Song et al. |
| 2017/0344988 | A1 | 11/2017 | Cusden et al. |
| 2017/0352116 | A1 | 12/2017 | Pierce et al. |
| 2017/0366348 | A1 | 12/2017 | Weimer et al. |
| 2018/0006826 | A1 | 1/2018 | Smith et al. |
| 2018/0018723 | A1 | 1/2018 | Nagla et al. |
| 2018/0039667 | A1 | 2/2018 | Pierce et al. |
| 2018/0082256 | A1 | 3/2018 | Tummuru et al. |
| 2018/0089256 | A1 | 3/2018 | Wright, Sr. |
| 2018/0109541 | A1 | 4/2018 | Gleichauf |
| 2018/0137306 | A1 | 5/2018 | Brady et al. |
| 2018/0183606 | A1 | 6/2018 | High et al. |
| 2018/0211038 | A1 | 7/2018 | Breiman et al. |
| 2018/0219671 | A1 | 8/2018 | Velissarios et al. |
| 2018/0240107 | A1 | 8/2018 | Andrade |
| 2018/0253702 | A1 | 9/2018 | Dowding |
| 2018/0276666 | A1 | 9/2018 | Haldenby et al. |
| 2018/0285879 | A1 | 10/2018 | Gadnis et al. |
| 2018/0330385 | A1 | 11/2018 | Johnson et al. |
| 2018/0331835 | A1 | 11/2018 | Jackson |
| 2019/0018888 | A1 | 1/2019 | Madisetti et al. |
| 2019/0057362 | A1 | 2/2019 | Wright |
| 2019/0081961 | A1 | 3/2019 | Bansal |
| 2019/0132350 | A1 | 5/2019 | Smith et al. |
| 2019/0156301 | A1 | 5/2019 | Bentov et al. |
| 2019/0164156 | A1 | 5/2019 | Lindemann |
| 2019/0196899 | A1 | 6/2019 | Sylvester et al. |
| 2019/0199535 | A1 | 6/2019 | Falk |
| 2019/0229892 | A1 | 7/2019 | Jevans |
| 2019/0245699 | A1 | 8/2019 | Irwan et al. |
| 2019/0279215 | A1 | 9/2019 | Kuchar |
| 2019/0354725 | A1 | 11/2019 | Lowagie |
| 2019/0370797 | A1 | 12/2019 | Jevans et al. |
| 2020/0082109 | A1 | 3/2020 | Kallos et al. |
| 2020/0097653 | A1* | 3/2020 | Mehta ................. G06N 3/045 |
| 2020/0160344 | A1 | 5/2020 | Jevans et al. |
| 2020/0167779 | A1 | 5/2020 | Carver et al. |
| 2021/0006399 | A1 | 1/2021 | Lee |
| 2021/0075592 | A1 | 3/2021 | Zhuo |

FOREIGN PATENT DOCUMENTS

| | | |
|---|---|---|
| EP | 3884441 A1 | 9/2021 |
| GB | 2593647 A1 | 9/2021 |
| GB | 2594396 A1 | 10/2021 |
| WO | WO2019071458 A1 | 4/2019 |
| WO | WO2019144042 A1 | 7/2019 |
| WO | WO2019231772 A1 | 12/2019 |
| WO | WO2020010279 A1 | 1/2020 |
| WO | WO2020106638 A1 | 5/2020 |
| WO | WO2020106639 A1 | 5/2020 |

OTHER PUBLICATIONS

Chaum, D.,"Blind signatures for untraceable payments" in Chaum D., Rivest R.L., Sherman A.T. (eds) Advances in Cryptology: Proceedings of Crypto 82, 1983, pp. 199-203.

Chaum, David Lee, "Computer Systems Established, Maintained, and Trusted by Mutually Suspicious Groups", Dissertation, Department of Computer Science, University of California, Berkeley, May 22, 1982, 96 pages.

Conti et al., "On the Economic Significance of Ransomware Campaigns: A Bitcoin Transactions Perspective", arxiv.org, Cornell University Library, Apr. 4, 2018, 24 pages.

Fleder et al., "Bitcoin Transaction Graph Analysis", Feb. 5, 2015 [retrieved May 25, 2021]; Retrieved from the internet: <https://arxiv.org/abs/1502.01657>, 8 pages.

Kharraz et al., "Cutting the Gordian Knot: A Look under the Hood of Ransomware Attacks", International Conference on Detection of Intrusions and Malware, and Vulnerability Assessment, Jun. 23, 2015, Retrieved from the internet <http://193.55.114.1/docs/dimva15_ransomware.pdf> on Jan. 2020, 28 pages.

Kun (j2kun), "Optimism in the Face of Uncertainty: the UCB1 Algorithm", [online] Oct. 28, 2013 [retrieved Jun. 9, 2021]; Retrieved from the internet: <https://jeremykun.com/2013/10/28/optimism-in-the-face-of-uncertainty-the-ucb1-algorithm/>, 17 pages.

Meiklejohn et al., "A Fistful of Bitcoins: Characterizing Payments Among Men with No Names", IMC '13: Proceedings of the 2013 conference on Internet measurement conference, Oct. 2013, 127-140, Retrieved from the internet: <https://cseweb.ucsd.edu>, <https://cseweb.ucsd.edu/~smeiklejohn/files/imc13.pdf> on May 25, 2021, 13 pages.

(56) References Cited

OTHER PUBLICATIONS

Moser et al., "An Inquiry into Money Laundering Tools in the Bitcoin Ecosystem", IEEE 2013 APWG eCrime Researchers Summit (eCRS), 2013, 1-14, Retrieved from the internet: <https://maltemoeser.de>, <https://maltemoeser.de/paper/money-laundering.pdf> on retrieved May 25, 2021, 14 pages.
Moser et al., "Towards Risk Scoring of Bitcoin Transactions", Financial Cryptography and Data Security, Mar. 7, 2014, 18 pages, Springer Berlin Heidelberg, Berlin.
Pesch et al., "Datenschutz trotz öffentlicher Blockchain?", Datenschutz und Datensicherheit—DUD, vol. 41, Issue 2, Feb. 3, 2017, 6 pages.
Prasad, "Lessons From Implementing AlphaZero", Web page <https://medium.com/oracledevs/lessons-from-implementing-alphazero-7e36e9054191>, Jun. 5, 2018, Retrieved from the internet on Jun. 9, 2021, 4 pages.
Reid et al., "An Analysis of Anonymity in the Bitcoin System", in Privacy, security, risk and trust (PASSAT), 2011 IEEE Third international Conference on Social Computing (Socialcom). IEEE, 2011, pp. 1318-1326.
Reid et al., "An Analysis of Anonymity in the Bitcoin System", Jul. 22, 2011 [retrieved May 25, 2021]; Retrieved from the internet: <https://arxiv.org/abs/1107.4524>, 30 pages.
Van Saberhagen, "CryptoNote v 2.0", Bytecoin, Oct. 17, 2013, Retrieved from the internet <https://bytecoin.org/>, <https://bytecoin.org/old/whitepaper.pdf> on May 25, 2021, pp. 1-20.
Welsh, "Bandit Algorithms Continued UCB1", University of Birmingham, School of Computer Science—Lecture Notes, <https://www.cs.bham.ac.uk/internal/courses/robotics/lectures/>, Nov. 9, 2010, 17 pages.
"Ye et al., ""Alt-Coin Traceability"", The International Association for Cryptologic Research Archive, May 18, 2020, Retrieved from the internet: <https://eprint.iacr.org/2020/593> on May 25, 2021, 24 pages".
EP Application No. 19886682.4, European Search Report, dated Aug. 18, 2022, 8 pages.
EP Application No. 19887238.4, European Search Report, dated Jul. 19, 2022, 8 pages.
GB Application No. GB2108893.5, Examination Report under Section 18(3), dated Jun. 20, 2022, 8 pages.
Patent Cooperation Treaty Application No. PCT/US2019/014346, International Search Report and Written Opinion of the International Searching Authority, dated Apr. 22, 2019, 6 pages.
Patent Cooperation Treaty Application No. PCT/US2019/033399, International Search Report and Written Opinion of the International Searching Authority, dated Aug. 1, 2019, 8 pages.
Patent Cooperation Treaty Application No. PCT/US2019/062047, International Search Report and Written Opinion of the International Searching Authority, dated Jan. 24, 2020, 13 pages.
Patent Cooperation Treaty Application No. PCT/US2019/062049, International Search Report and Written Opinion of the International Searching Authority, dated Jan. 27, 2020, 10 pages.

* cited by examiner

ExampleExchange_addressRisk

| risk_score | percentage | count | timestamp | date |
|---|---|---|---|---|
| 0 | 0 | 0 | 1539362595 | 2018-10-12T16:43:15Z |
| 1 | 39.01081805 | 53911 | 1539362595 | 2018-10-12T16:43:15Z |
| 2 | 0 | 0 | 1539362595 | 2018-10-12T16:43:15Z |
| 3 | 0 | 0 | 1539362595 | 2018-10-12T16:43:15Z |
| 4 | 1.88646478 | 2607 | 1539362595 | 2018-10-12T16:43:15Z |
| 5 | 25.77734361 | 35623 | 1539362595 | 2018-10-12T16:43:15Z |
| 6 | 0 | 0 | 1539362595 | 2018-10-12T16:43:15Z |
| 7 | 0 | 0 | 1539362595 | 2018-10-12T16:43:15Z |
| 8 | 0 | 0 | 1539362595 | 2018-10-12T16:43:15Z |
| 9 | 0 | 0 | 1539362595 | 2018-10-12T16:43:15Z |
| 10 | 33.32537357 | 46054 | 1539362595 | 2018-10-12T16:43:15Z |
| TOTAL | 100 | 138195 | 1539362595 | 2018-10-12T16:43:15Z |

CRYPTOCURRENCY BASED MALWARE AND RANSOMWARE DETECTION SYSTEMS AND METHODS

CROSS-REFERENCE TO RELATED APPLICATION(S)

This application is a continuation of U.S. patent application Ser. No. 16/685,928 filed Nov. 15, 2019, entitled "Cryptocurrency Based Malware and Ransomware Detection Systems and Methods", which claims the benefit and priority of U.S. Provisional Application No. 62/770,113, filed on Nov. 20, 2018, entitled "Malware Detection and Prevention from a Remote Server Using Cryptocurrency Addresses", each of which is hereby incorporated by reference herein in its entirety, including all references and appendices cited therein, for all purposes. This application also claims the benefit and priority of U.S. Provisional Application No. 62/770,109, filed on Nov. 20, 2018, entitled "Blockchain Transaction Analysis and Anti-Money Laundering Compliance Systems and Methods", which is hereby incorporated by reference herein in its entirety, including all references and appendices cited therein, for all purposes.

FIELD OF INVENTION

Embodiments of the present disclosure relate to systems and methods that provide cryptocurrency-based malware and ransomware detection and cryptocurrency transaction processing.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method comprising analyzing a plurality of malware or ransomware attacks by: determining a uniform resource locator (URL) of a decryptor download site of a malware or ransomware attack; determining a cryptocurrency payment address of the malware or ransomware attack; determining a receipt or a decoder for the malware or ransomware attack; and tracing a ransom payment paid to the cryptocurrency payment address in response to the malware or ransomware attack; building a malware or ransomware attack database with cryptocurrency payment addresses of the plurality of malware or ransomware attacks; and identifying when a proposed cryptocurrency transaction includes an address that is included in the malware or ransomware attack database.

Another embodiment includes a system comprising a processor; and a memory for storing instructions, the processor executing the instructions to: analyze a plurality of malware or ransomware attacks to determine cryptocurrency payment address of malware or ransomware attacks; build a malware or ransomware attack database with the cryptocurrency payment addresses of the plurality of malware or ransomware attacks; identify a proposed cryptocurrency transaction that includes an address that is included in the malware or ransomware attack database; and deny the proposed cryptocurrency transaction.

Another embodiment includes a method comprising analyzing a plurality of malware or ransomware attacks to determine cryptocurrency payment address of malware or ransomware attacks; building a malware or ransomware attack database with the cryptocurrency payment addresses of the plurality of malware or ransomware attacks; identifying a proposed cryptocurrency transaction that includes an address that is included in the malware or ransomware attack database; and denying the proposed cryptocurrency transaction.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 2 illustrates a table comprising an example address specific risk analysis.

FIGS. 8A and 8B collectively illustrate an example screenshot of a ransomware note displayed on an end user device.

FIG. 9 illustrates a portion of a disassembled malware code sample.

DETAILED DESCRIPTION

Figure 1:
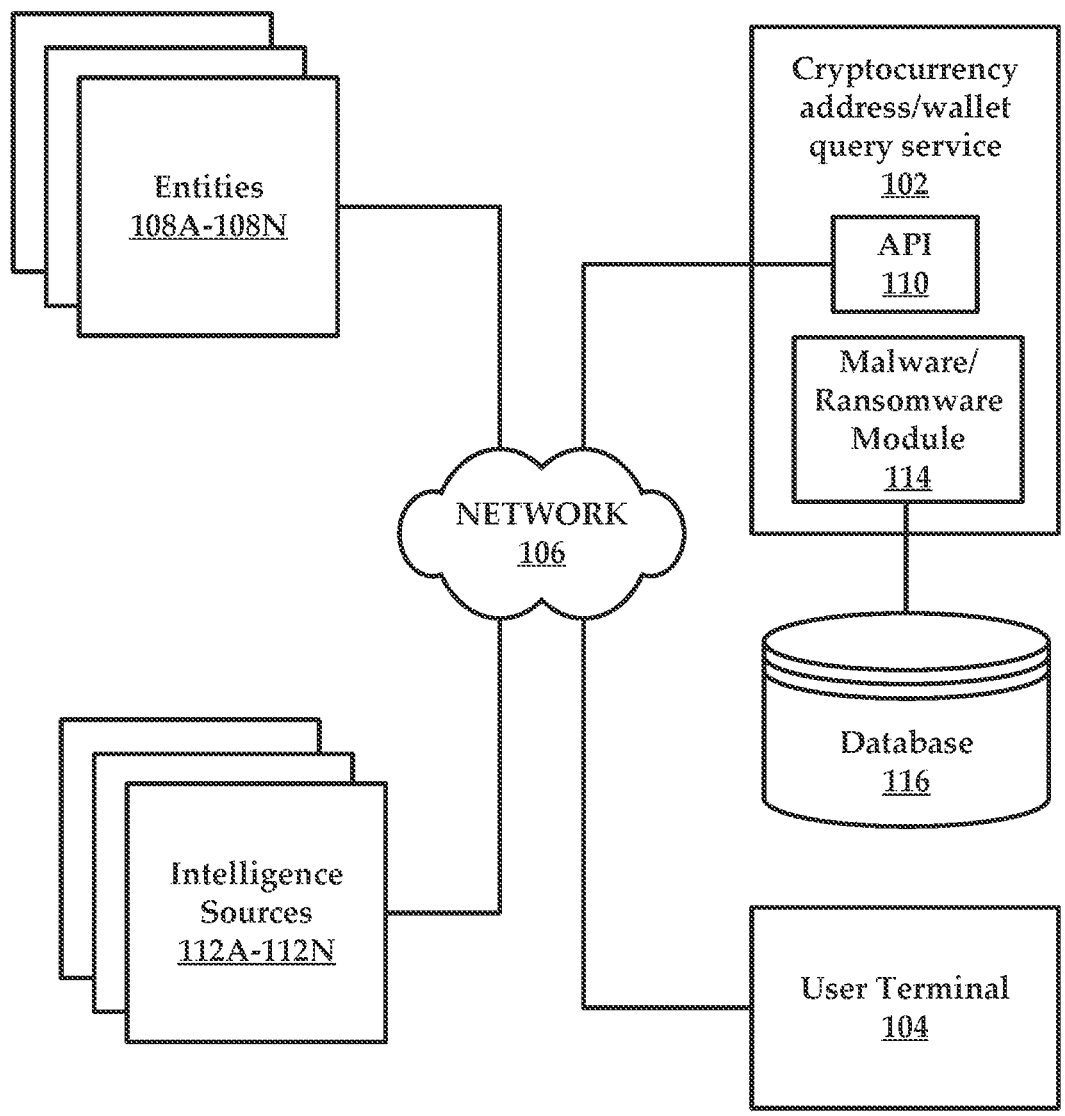
FIG. 1 is a schematic diagram of an example environment where aspects of the present disclosure can be practiced.

Embodiments of the present disclosure relate to systems and methods that enable the analysis of blockchain transactions for purposes of compliance. For example, blockchain transactions can be analyzed through machine learning for evidence of malicious behavior. These analyses include scoring and other actionable metrics that allow entities to fulfill their compliance requirements such as anti-money laundering compliance. Entities that can implement the present disclosure include but are not limited to cryptocurrency exchanges/platforms, hedge funds, money service businesses, regulators (e.g., government agencies), and ICO providers (initial coin offering), intelligence agencies, attorneys, auditors, banks, brokerages, and security researchers—just to name a few.

In some embodiments, the features and functions of the present disclosure are implemented as a web-deployed service that is accessible through a secure connection. For example, the services of the present disclosure can be implemented on a server. The server(s) of this disclosure are specifically configured computing devices that are provisioned according to the disclosures herein. In certain embodiments the server implements a secure application programming interface (API). The API is presented as a secure HTTP based query service with JSON encoded data. In general, the service accessible through the API allows for blockchain transaction analysis on a crypto wallet basis. The service can analyze individual blockchain transactions over a wide array of attributes.

The service is configured to profile countless numbers of global exchanges, ATMs, mixers, money laundering systems, gambling services and known criminal addresses to score transactions and assess risk. The service then assigns risk levels to transactions based on activity related to suspicious addresses and wallets. The service applies algorithms that calculate risk levels based on associating suspicious addresses and wallets. As noted herein, this can be performed using a variety of machine learning algorithms.

Also, the systems and methods disclosed herein provide a specific improvement in a computing technology related to improving the speed of data calculations in the context of blockchain analysis. That is, the present disclosure implements high speed APIs within the technical field of compliance automation in order to mitigate risk. In some embodiments, a robust API is utilized which delivers real-time assessments of cryptocurrency transaction risk. This interface can be rapidly integrated with an existing compliance infrastructure to provide real-time evaluations of cryptocurrency transaction risk. The high-performance API quickly returns actionable risk scores for each transaction. Customers can then make decisions on whether to investigate a customer for violations of their AML (anti-money laundering) policy or local regulations. The API can automatically produce a deeper level of analysis to provide the level of detail required by regulators, including FinCEN, for Suspicious Activity Reports (SARs).

FIG. 1 is a schematic view of an example environment for practicing aspects of the present disclosure. The environment may include a cryptocurrency address/wallet query service (hereinafter service 102), a user terminal 104, and a network 106. The service 102 can be used to query cryptocurrency addresses/wallets/exchanges or other entities that perform cryptocurrency transactions. These entities are generally illustrated as entities 108A-108N. The service 102 implements an API 110 that allows users to have access to the features of the service 102 such as an address/wallet query service with transaction details and risk scores. Other features include historical addresses balance information, IP (Internet Protocol) info for addresses, and other related IP info for specific transactions.

Communication with the service 102 occurs through the API 110 over an authenticated connection using a self-signed certificate on the service side. Each customer (an entity of the entities 108A-108N) can create their own private key for access to the API 110. Once authenticated, the user terminal 104 can query the server using any suitable query structure. An example response to a query results in the identification of wallet information for a specific address. Thus, transactions associated with a particular wallet ID are located, processed, and returned with actionable metrics such as a wallet risk score. In addition to wallet analysis, the service can analyze specific instances of blockchain transactions or aggregations thereof. In some embodiments, scores are created when a blockchain address is searched. These features are described in greater detail infra.

The service 102 may utilize various wallet data structures such as a name that identifies an owner of the wallet, a URL (uniform resource locator) that identifies a URL of the owning entity (if available), a country of the owner (if available), a subpoenable value that identifies if the entity/owner can be subpoenaed or not, as well as an entity type identifier. An entity can be identified as a criminal, a consumer, an exchange, or any other suitable entity identification.

Wallets can be identified from using a unique wallet identifier provided by the service 102, an owner name, an address count (number of addresses in a wallet), a revision (an incrementing revision number for the wallet. If the revision changes the wallet should be re-fetched), a wallet change value (set to true if the wallet identifier has changed. The wallet can be re-fetched with the new wallet identifier), and address list (a list of addresses in the wallet. The set of addresses returned depends on query parameters).

The service 102 can be configured to provide transaction query options. Transaction query options include, but are not limited to, transaction history for an address over a given date range, and details for a list of transactions. Transaction data structures such as a transaction history can comprise a structure that includes a list of transaction hashes that included the search address over a given date range. The transaction history can include an address which identifies an address to query, along with a start date of the query range (unix epoch time), an end date of the query range (unix epoch time), and transactions that can include an array of transactions which included the searched address as an input or output. That is, the address can be searched as a destination and/or origination address for a cryptocurrency transaction.

Structures detailing an input to a transaction can include a position value (indicates a position of the input), an address (the address used in an input), a value (indicates a total coin spend for an input). Structures detailing an output to a transaction can include similar data.

A transaction can have specific structures such as a hash (hash of a specified transaction), a data (a date of the transaction (unix epoch time), a total (total value of the transaction, which may include exchange or conversion fees), a fee (transaction fee), inputs (transaction inputs or originating addresses), outputs (transaction outputs or receiving addresses), error value (indicative of any errors during a query process for the transaction). An address can also have a specific structure such as wallet details for a particular address.

The service 102 can also implement structure to detail a list of transactions such as transactions (an array of details of queried transactions), addresses (a map of an address to address information, such as a hash table detailing address structures for input/output addresses in a transaction array), and IP history (a map vector IP information, which includes a hash map of IP address information for addresses and transactions contained in a wallet. These can be indexed by address or transaction hash when IP information is present).

The service 102 can allow users to query addresses. In general, address queries allow for determinations of address balance, transaction history, and IP address searches. The balance of an address can be specified by a transaction hash for a balance, a sequential index of transaction information (useful for sorting transactions in a block), an address balance after a transaction has been applied, an indication of how much an address contributed to a particular transaction if the address was identified as an input, and/or an indication of how much an address received to a particular transaction if the address was identified as an output.

IP information can be determined for an IP address that was identified against an address or transaction. The IP information can include an IP address, a country of the IP address, a city of the IP address, a version string as reported, a latitude and/or longitude of the IP address, and/or epoch time that the IP address was determined to be a match with an address or transaction.

Address results can include an identification of a cryptocurrency address, a start and/or end date of a query, wallet information for an address, a current balance of an address, a number of deposits in the address (e.g., transaction output to address), number of spends (transaction inputs from this address), total amount deposited into and or taken out of the account, a block-height of a last transaction involving the address, an indication if the address is referenced, and a transaction history (within a specified date range) for the address, and/or an IP history for the address. Addresses can be queried for an ending balance at a given point in time (can be either a final transaction balance in a returned result or the balance at a time of a last transaction with the address before a given point in time), how much the address has spent or received, and/or a number of deposits or purchases made using the address.

In various embodiments, the user terminal 104 can communicate with the service 102 in a secure and authenticated manner with a self-signed certificate on the server side (e.g., service 102). Each customer generates a unique 4096 bit RSA key. The user terminal 104 can provide the key back to the service 102. The service 102 can return an encrypted secret to the user terminal. The user terminal 104 can decrypt the message using their key. Once authenticated, the user terminal 104 can transmit queries to the service 102. As noted above, queries can be submitted to identify wallet information for a specified address. Another query could be submitted to identify wallet information related to a specific wallet identifier. A single wallet identifier can be provided. If the wallet state has changed, the revision field will be incremented, as noted above. In this case if a user is tracking addresses, they should proceed to re-retrieve the entire address list. Similarly, if the provided wallet identifier is an older identifier that has been merged with other wallets a new wallet identifier will be returned and an indication that the wallet identifier has changed is provided.

In another use case, a single wallet identifier can be queried. A starting address offset is provided in the query. This offset can be a multiple of 100 (any value will be rounded down to the nearest 100). The count parameter can be between 100 and 10000. The count parameter can also be a multiple of 100. Offset and count are used to index through the address list. So, if a first query is offset=100 and count=1000 then the next query would be offset=1100 and count=1000 (or whatever count value that is preferred).

In various embodiments, the service 102 can provide a transaction history for a cryptocurrency address. For example, a query returns a list of transactions that have included a specified address within a date range. Another query returns details on a specified list of transaction hashes (maximum of 10 hashes) as well as attribution data for all addresses used in the transactions. Another query can provide an IP history map that details any IP address matches for transaction and address hashes included in the response. Only hashes that have IP information are included in the map.

The service can also provide address search functionality. An example query returns information regarding a cryptocurrency address. This could include current balance information as well as (optional) balance history with transaction hashes and IP address match history. Another example query can include an address parameter that specifies the address to search on, as well as a start date and end date (these are optional fields that limit the date range searched (values are in unix epoch time)). The date range searched is inclusive of the starting and ending date. An optional parameter can be selected which details which type of optional information the requester wishes (as a comma separated list).

In some embodiments, the service implements a distinct risk scoring API that allows customers to test blockchain addresses and blockchain transactions for potential risk in order to comply with anti-money laundering requirements. This also allows for address and transaction mapping and analysis to prevent a suspicious transaction before the transaction occurs. By way of example, a cryptocurrency platform may select to query a potential transaction looking at the wallets of the parties to a scheduled or potential transaction and the potential route of the transaction to determine if the transaction should be allowed or canceled. The transaction can be modeled using historical transactions involving one or more of the parties. This analysis is further effectuated through the calculation and provision of actionable risk scores for the proposed transaction. If the risk score is high, the transaction can be canceled and conversely allowed if the risk score is below a critical threshold.

In some implementations, the risk scoring API allows a platform to specify a currency and either an address or a transaction hash. This information is utilized to specifically analyze all aspects of a potential transaction. Risk scores can be generated for an address (e.g., is this address associated with malicious activity, either directly or indirectly). Risk scores can also be generated on a transaction basis.

The service 102 can provide a transaction risk score query for a transaction. The risk score is the highest risk score of all the addresses, both input and output, for the transaction. If a user requires more data on the fine grained risk information, use the service 102 can provide a list of the input and output transactions, and then call anti-money-laundering/ Bitcoin/address in order to get a detailed risk score on the address which is a component of the transaction.

In some embodiments, a risk score corresponds to the following criteria: (0) Low Risk No attribution or transactions for the address; (1) Low Risk No negative attribution; (5) Caution One transaction from criminal type activities; and (10) High Risk Multiple transactions from criminal type activities or direct attribution to a criminal or high risk address. Example criminal type activities are money laundering mixers, tumblers, foggers, stolen coins, ransomware or malware, gambling sites and Ponzi Schemes, and/or dark markets.

In various embodiments, the service 102 can provide blockchain forensics methodologies and systems that incorporate aspects of active attribution of data and machine learning to process the data into actionable cryptocurrency intelligence. In some embodiments, the active attribution of data provides specific information regarding cryptocurrency accounts, including data obtained from the dark market and deep web searching, as well as analysis on full blockchain nodes. In some instances, the systems and methods of the present disclosure obtain data from any of these data sources by engaging in and/or tracking specific transaction flows in various cryptocurrency exchanges. By identifying bad actors and tracking how other parties (e.g., digital wallets) interact with these bad actors, a proposed or previously performed transaction can be scored with a risk score.

Example machine learning algorithms include but are not limited to Bayesian clustering, inductive logic, learning classifiers, reinforcement, association, and similarity—just to name a few. These machine learning algorithms are used to process the wide array of data regarding cryptocurrency transactions and/or digital wallets. In general, these processes aggregate transactions for wallets or addresses. In one example, all transactions occurring through a specific crypto exchange can be aggregated and analyzed. This can also occur on a per entity basis so that individual bad actors can be identified.

In some embodiments, the service 102 can utilize information obtained from various intelligence sources 112A-112N, such as proprietary discovery algorithms and analysts, public sources, honeypots and other active capture sources, trusted communities, including law enforcement and regulators, a Crypto Recovery Network, Anti-Phishing Working Group eCrime Exchange (eCX), and so forth.

The service implements machine learning algorithms, advanced statistical analysis, and clustering techniques to distill meaning from this massive data lake, resulting in a high-resolution view of the cryptocurrency risk land-scape. This view spans everything from dark markets to hundreds of global exchanges, delivering actionable intelligence for AML/ATF investigation and compliance monitoring.

As noted above, parties to a transaction can be identified by the risk scoring of the service 102 as criminal, dark market, gambling, mixer, ATM, and exchange. Each of these identified parties can be assigned a risk score from 1-10 with 10 indicating a highest risk.

FIG. 2 illustrates a table 200 comprising an example address specific risk analysis. This table includes risk scores for an entity (crypto exchange) related to the various transaction performed by that crypto exchange within a given period of time. Risk scores are noted from 1-10 and transactions are aggregated and scored to fall into one of these scores. In total, 39% of transactions performed on the crypto exchange were found to have a very low score of 1. Conversely, 33% were found to have a very high risk score of 10. The crypto exchange can be scored relative to the breakdowns provided in any given table. Also, these scores allow entities to be benchmarked and compared to one another in terms of their specific risk score breakdowns. Thus, one crypto exchange can be compared to one or more other crypto exchanges based on a distribution of risk scores for each crypto exchange. For example, if another crypto exchange has a number of transactions that fall into the very high risk score level it could be considered "safer" than crypto exchanges having higher numbers of transactions in the very high risk score level.

Figure 3:
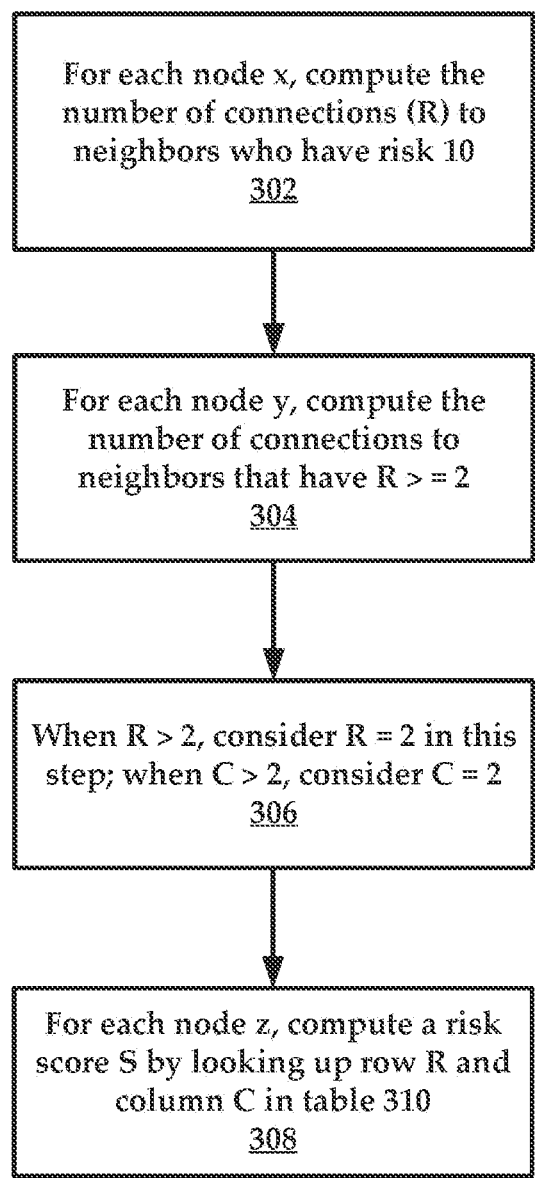
FIG. 3 illustrates an example risk classification process.

FIG. 3 illustrates an example risk classification process. Consider a set of bitcoin addresses as nodes and transactions as edges connecting them. Initially the process starts with a finite list of addresses that have a risk score of 10 and no other scores set. For each of the remaining nodes that are not yet marked, the following method can be used. The method can include a step 302 where for each node (node could be a wallet or address), compute the number of connections to neighbors who have risk 10, which is referred to as R. In a second step 304, for each node y, compute the number of connections to neighbors that have R>=2. This number is referred to as C. In step 306, when R>2, consider R=2 in this step. Similarly, when C>2, consider C=2 in this step. In step 308, for each node z, compute a risk score S by looking up row R and column C in table 310. For trusted exchange addresses, lookup table can be capped at (2) two. All addresses that have been seen on a blockchain have a risk of at least (1) one. Unseen addresses have a notional risk of (0) zero unless they are listed on the 10-risk list.

Figure 4:
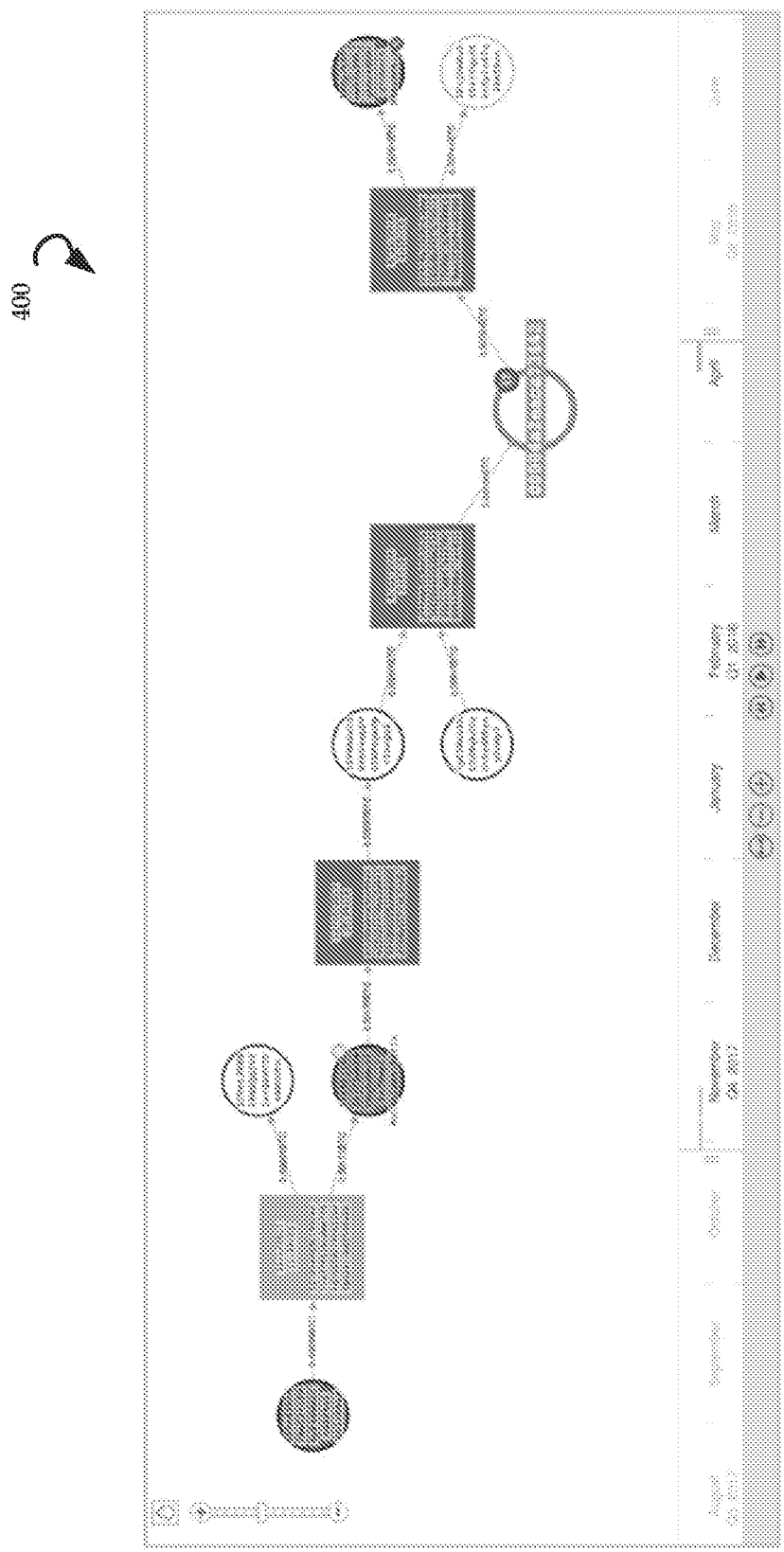
FIG. 4 illustrates an example GUI (graphical user interface) that enables users to step backward and forward through transaction histories to discover and document risky transactions.

The service 102 herein comprises an active attribution data process that allows users to take advantage of live interactions with a powerful graph database to trace the flow of funds over time and through the cryptocurrency ecosystem. The service 102 also provides unique GUIs that provide powerful inspection capabilities. FIG. 4 illustrates an example GUI 400 that enables users to step backward and forward through transaction histories to discover and document risky transactions. This is also used to vet new customers and their sources of funds. Each entity can be color coded according to risk level and each entity is positioned on the visual display according to a flow of the transaction. Entities or services within the transaction flow are connected according to their specified interactions.

Figure 5:
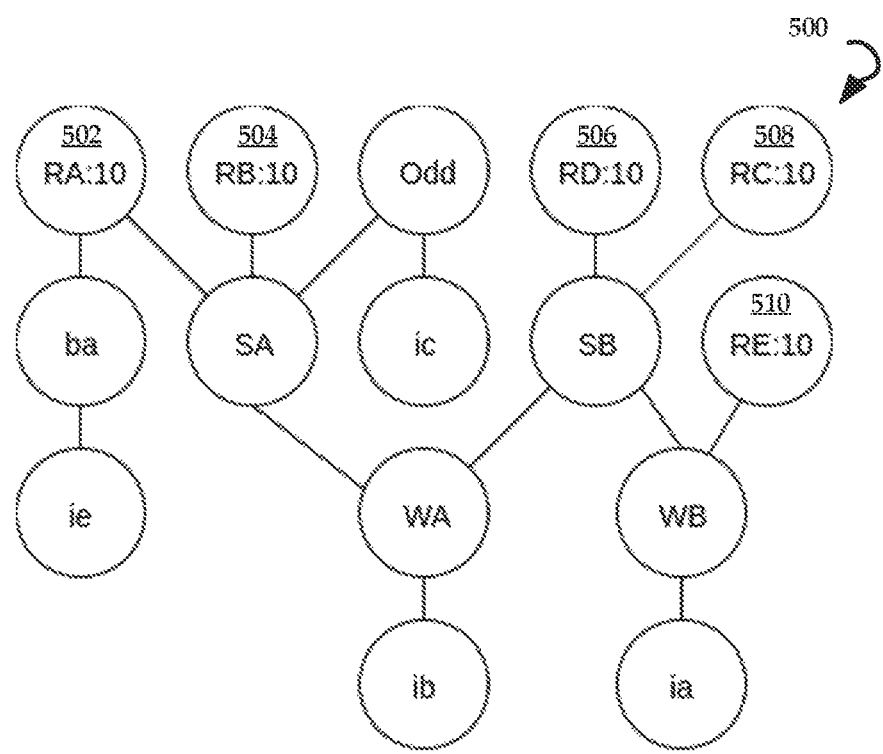
FIGS. 5 and 6 collectively illustrate graphs of unscored and scored transactions for an entity.
Figure 6:
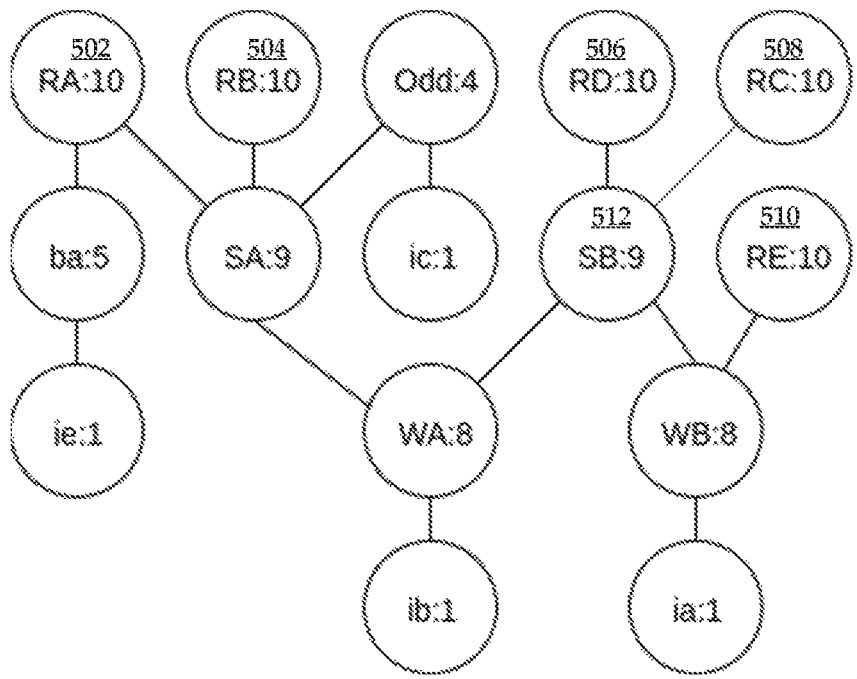

FIGS. 5 and 6 illustrate graphs of unscored and scored transactions. In FIG. 5, a graph 500 is provided with a plurality of transactions illustrated in a graphical format. Elements that are indicated with 10, such as elements 502-510 are indicative of addresses or wallets that are known to be associated with malicious actors (indicated as a high risk). FIG. 6 illustrates a graph 600 which is the graph of FIG. 5 with scores associated with particular transactions. In this example, element 512 has a calculated risk score of (9) nine due to its transaction connections to element 506. In this example, element 506 has an input to element 512. Element 512 also has an input from element 508. Connections to these two high-risk elements results in a high-risk score for element 512.

Figure 7:
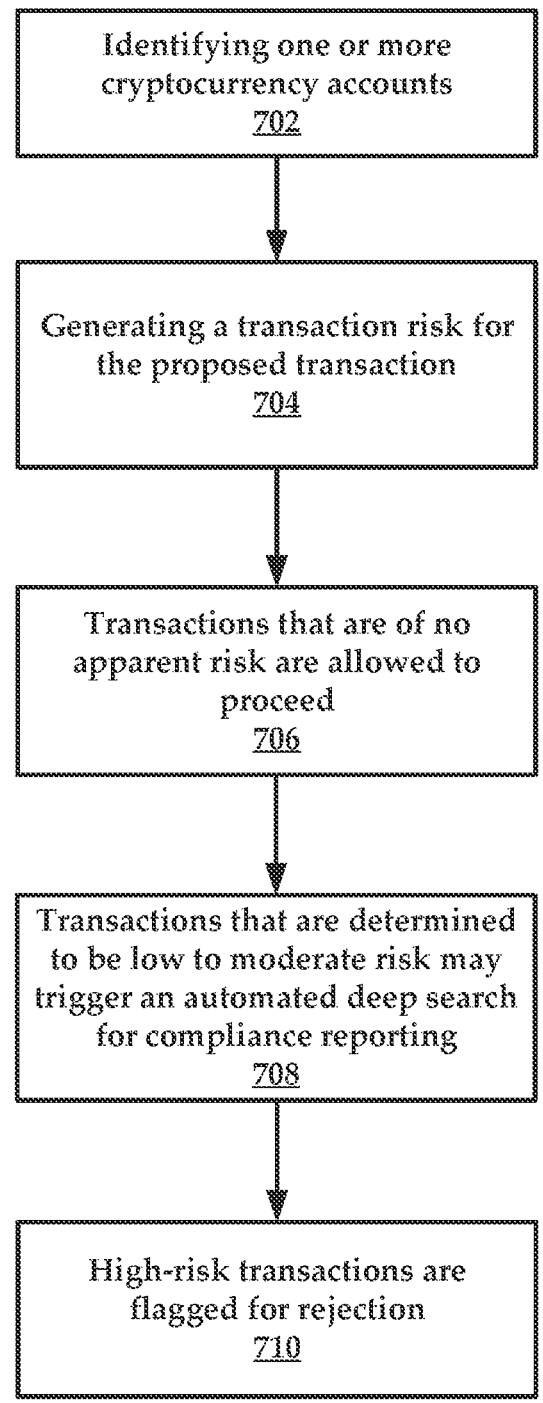
FIG. 7 is a flowchart of an example method of the present disclosure.

FIG. 7 is a flowchart of an example method of the present disclosure. The method can include a step 702 of identifying one or more cryptocurrency accounts. This can include a customer depositing money into a cryptocurrency account or otherwise purchasing cryptocurrency. In another example, a fund manager can invest in a cryptocurrency based investment, such as an initial coin offering (ICO).

Based on the addresses and/or wallets involved in a proposed transaction, the method can include a step 704 of generating a transaction risk for the proposed transaction. This can include any of the analyses disclosed herein. In step 706, transactions that are of no apparent risk are allowed to proceed. In step 708, transactions that are determined to be low to moderate risk may trigger an automated deep search for compliance reporting. In step 710, high-risk transactions are flagged for rejection. In one example use case, a cryptocurrency exchange (e.g., an entity) can use the service 102 (see FIG. 1) to determine if transactions of exchange users should be allowed or rejected based on risk scoring.

In some embodiments, the entity requesting the analysis can then make decisions on whether to investigate a customer for violations of their AML policy or local regulations.

The service 102 can automatically produce a deeper level of analysis to provide the level of detail required by regulators, including FinCEN, for Suspicious Activity Reports (SARs). Broadly, the service 102 can assess parameters of the address for each of the plurality of malware or ransomware attacks and compare one or more addresses of the proposed cryptocurrency transaction to the parameters. Based on this analysis, a proposed cryptocurrency transaction can be approved or denied.

Some embodiments relate malware detection and support prevention of malware infections from a remote server using blockchain addresses (e.g., cryptocurrency addresses). This can include a server that can detect ransomware/malware of an end user device in view of a proposed cryptocurrency transaction. The server can utilize a database of addresses created from known malware/ransomware crypto transactions and determine if any of the addresses in a proposed transaction will involve one or more of these addresses that are associated with bad actors. Processes for building the databases are also disclosed herein.

The present disclosure is also directed in some embodiments to malware detection and prevention from a remote server using cryptocurrency addresses. In some embodiments, a server (e.g., service 102) is configured to detect ransomware/malware of an end user device in view of a proposed cryptocurrency transaction. The service 102 can utilize a database of addresses created from known malware/ransomware crypto transactions and determine if any of the addresses in a proposed transaction will involve one or more of these addresses that are associated with bad actors. Processes for building the databases are also disclosed herein.

More specifically, but not by limitation, systems and methods herein enable the detection of malware and ransomware using a detailed transaction and/or address (e.g., blockchain address) analyses described above. In some embodiments, the systems and methods herein can deconstruct and analyze algorithms used to generate malware and/or ransomware. This can include tracking or tracing a malware and ransomware transaction(s) and reverse engineering of the malware and ransomware, as well as evaluating the algorithms used to generate the malware and/or ransomware associated addresses.

In some embodiments, malware and ransomware can be analyzed in order to locate bitcoin and/or other cryptocurrency addresses embedded in the malware and/or ransomware package. This can be facilitated by end users having systems infected with malware/ransomware. The users can copy or relay data from the malware and/or ransomware for use by the systems of the present disclosure.

In some embodiments, the systems and methods herein apply clustering algorithms disclosed to find related addresses (e.g., multi-input addresses) and store the same in a database. This database can include whitelist and blacklist cryptocurrency addresses, with blacklist cryptocurrency addresses being those addresses that have been found as being associated with malware/ransomware events. Also, in some embodiments, machine learning based inferences can be used to determine cryptocurrency addresses that are associated with blacklist cryptocurrency addresses. For example, cryptocurrency addresses that approximately correspond to known malware/ransomware cryptocurrency addresses can be identified and blocked. This inference can be facilitated using the multivariate address and/or transaction data collected for any given transaction or address. If an unknown cryptocurrency address possesses a similar number of attributes as a known malware/ransomware cryptocurrency address the unknown cryptocurrency addresses can be flagged as dangerous. Further evaluation in the future may confirm or negate this inference as more data are gathered by the system or the machine learning evolves.

A public API is enabled allowing real-time transaction lookups by exchanges (or other interested entities) when a customer desires to transmit funds to a cryptocurrency address. If the endpoint address (e.g., receiving cryptocurrency address) is stored in the database or is otherwise identified as being associated with malware/ransomware the exchange is alerted in real-time or near real-time that the customer is likely infected with malware/ransomware. In some instances, the transaction is automatically blocked, and the customer is identified. Thus, these systems and methods of the present disclosure provide a means for detecting malware/ransomware infected end user systems without having to install any software on the end user systems.

Referring back to FIG. 1, in some embodiments, the service 102 can be adapted to include a malware or ransomware module 114 that can be used to build a ransomware or malware database 116. In general, the malware or ransomware module 114 can obtain parameters of a plurality of malware and/or ransomware attacks. These parameters can be obtained from interrogating an end user computing system or device, such as the user terminal 104. For purposes of brevity and clarity, examples provided herein will discuss detecting ransomware, but it will be appreciated that the methodologies disclosed herein can be extended to detecting malware as well.

After building the database 116, cryptocurrency addresses can be searched against the database in real-time or as needed to determine if a proposed transaction involving the cryptocurrency address should be approved, denied, or further investigated. Example malware that can be identified includes, but is not limited to: WannaCry, Petya/NotPetya, SamSam Ransomware, Bad Rabbit Ransomware, Jaff Ransomware, Gandcrab Ransomware, Pylocky Ransomware, Princess Ransomware, Locky Ransomware, CryptoLocker Ransomware, Cerber Ransomware and BitPaymer/FriedEx.

In various embodiments, indicators of compromise can be identified to determine a specific ransomware strain if an entire computer system is not encrypted. For example, evaluation of a process list of the end user device can be used to identify any suspicious processes running. A name and details of the process can be recorded. Some embodiments include evaluating certain locations on an end user device such as appdata, temp, or programdata as these locations typically do not require elevated permissions to access. Another example includes identifying a file path used by the ransomware, or a registry path. Other examples include identifying network information or ransomware samples or hashes of the ransomware samples.

In some embodiments, images of a display of the end user device can be used to identify information such as an attacker's email address, cryptocurrency addresses, and identifying characteristics of the ransomware type. According to some embodiments, the methods disclosed herein can willingly infect or expose end user devices to ransomware attacks so as to gain as much information for ransomware attacks as possible and to create a robust ransomware database.

Figure 8A:
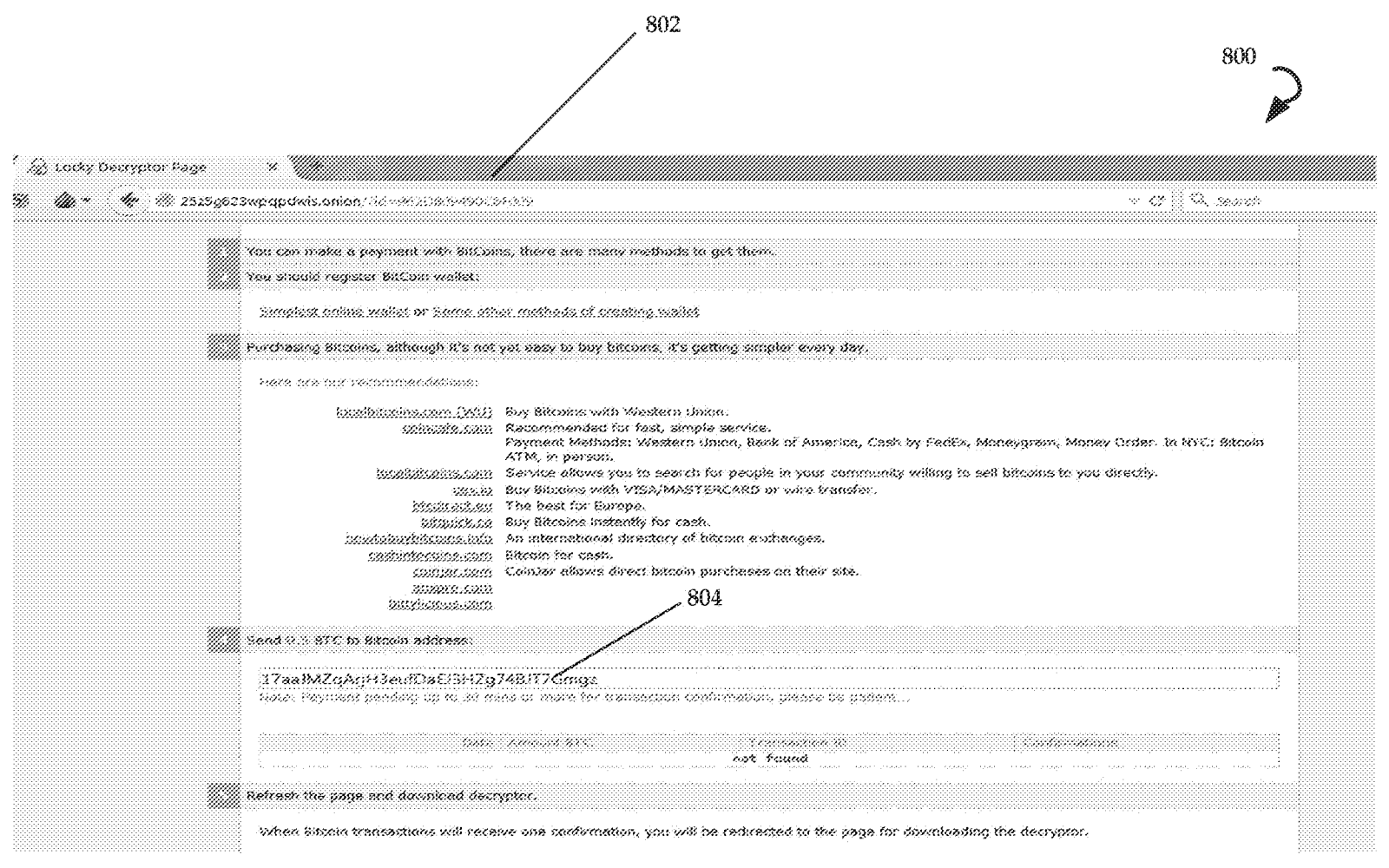
Figure 8B:
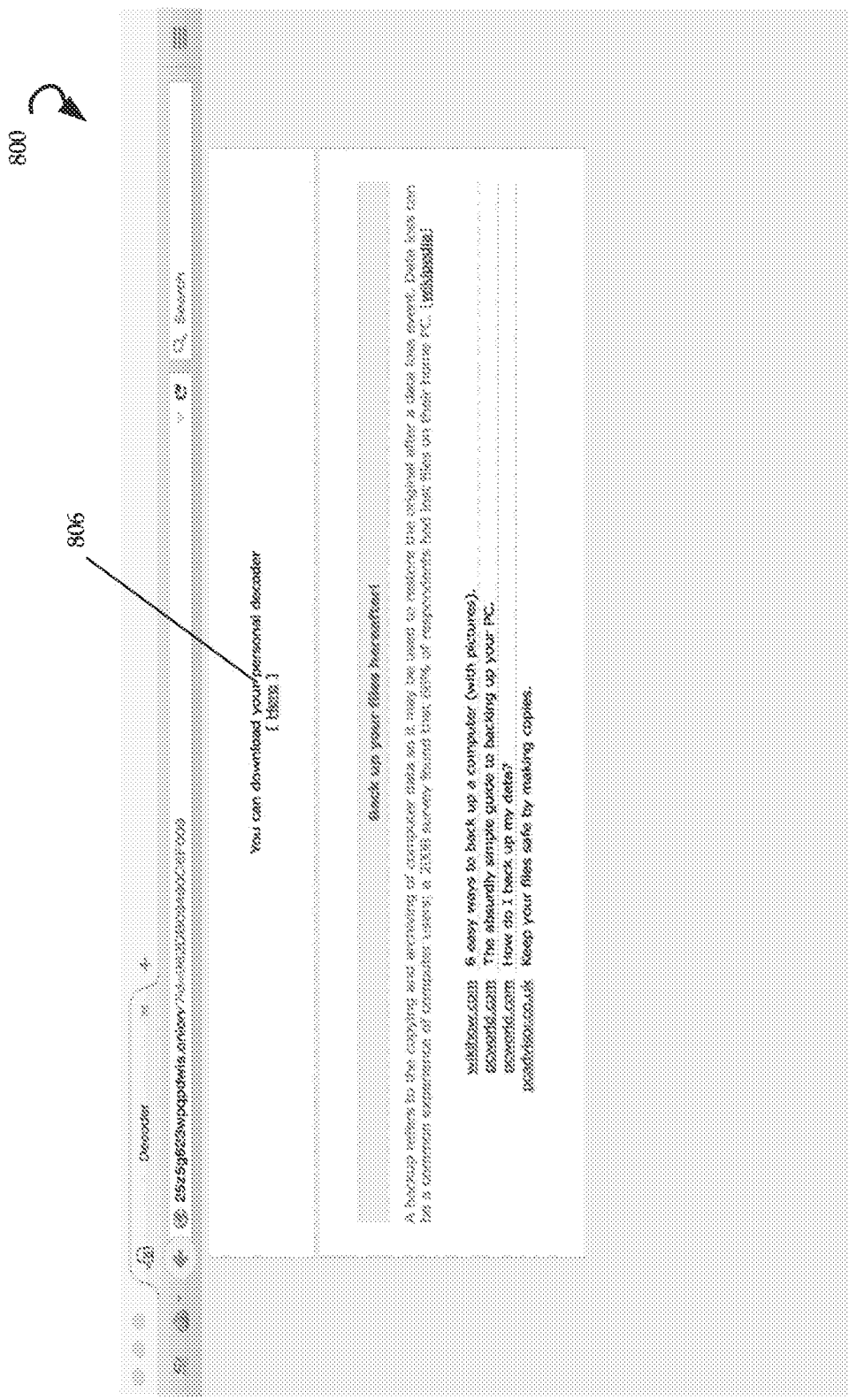

FIGS. 8A and 8B collectively illustrate an example screenshot of a ransomware note 800 displayed on an end user device. A uniform resource locator (URL) of a decryptor download site 802 of a malware or ransomware attack can be identified. A sample from the decryptor download site 802 can be obtained after a victim has paid a ransom to a variant of the ransomware attack that generates a unique key per victim.

A cryptocurrency payment address 804 of the ransomware attack can also be identified. A receipt or a decoder link 806 for the malware or ransomware attack can also be identified. In some embodiments, if available, the service 102 can obtain a sample of the ransomware code. This may be possible in instances where the user terminal 104 is not completed encrypted by the ransomware.

In some instances, the malware or ransomware module 114 of the service 102 can be configured to trace a ransom payment and create a visual representation of the ransom payment. This can include mapping cryptocurrency addresses involved in a ransom payment.

As noted above, the malware or ransomware module 114 of the service 102 can be configured to analyze a plurality of ransomware attacks to determine cryptocurrency transactions and/or cryptocurrency address involved in ransomware attacks.

Figure 9:
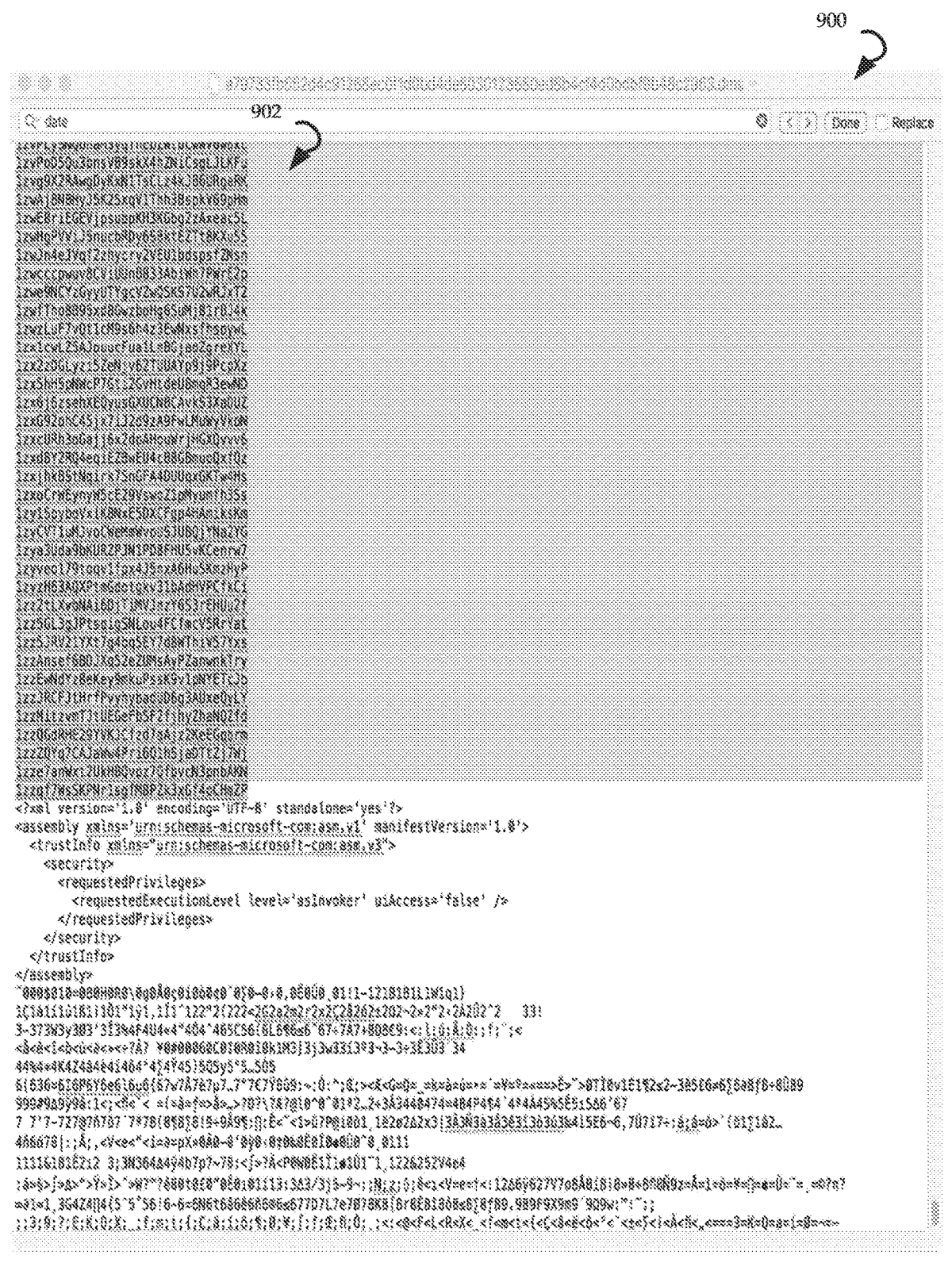

FIG. 9 illustrates an example disassembly of a Coinshuffler binary malware 900 by the malware or ransomware module 114 of the service 102. This disassembly results in the discovery of 600,000+ cryptocurrency addresses (a portion of which are illustrated as addresses 902) to which funds have been or are currently being sent. The malware or ransomware module 114 can determine victims of an exchange such as Coinbase who paid funds to these cryptocurrency addresses identified in the cryptocurrency addresses involved in the malware. The malware or ransomware module 114 uses a reverse search to find related addresses from the malware. Addresses found in the malware are loaded into the malware or ransomware module 114. The malware or ransomware module 114 then traces victim payments to one or more payoff accounts.

Figure 10A:
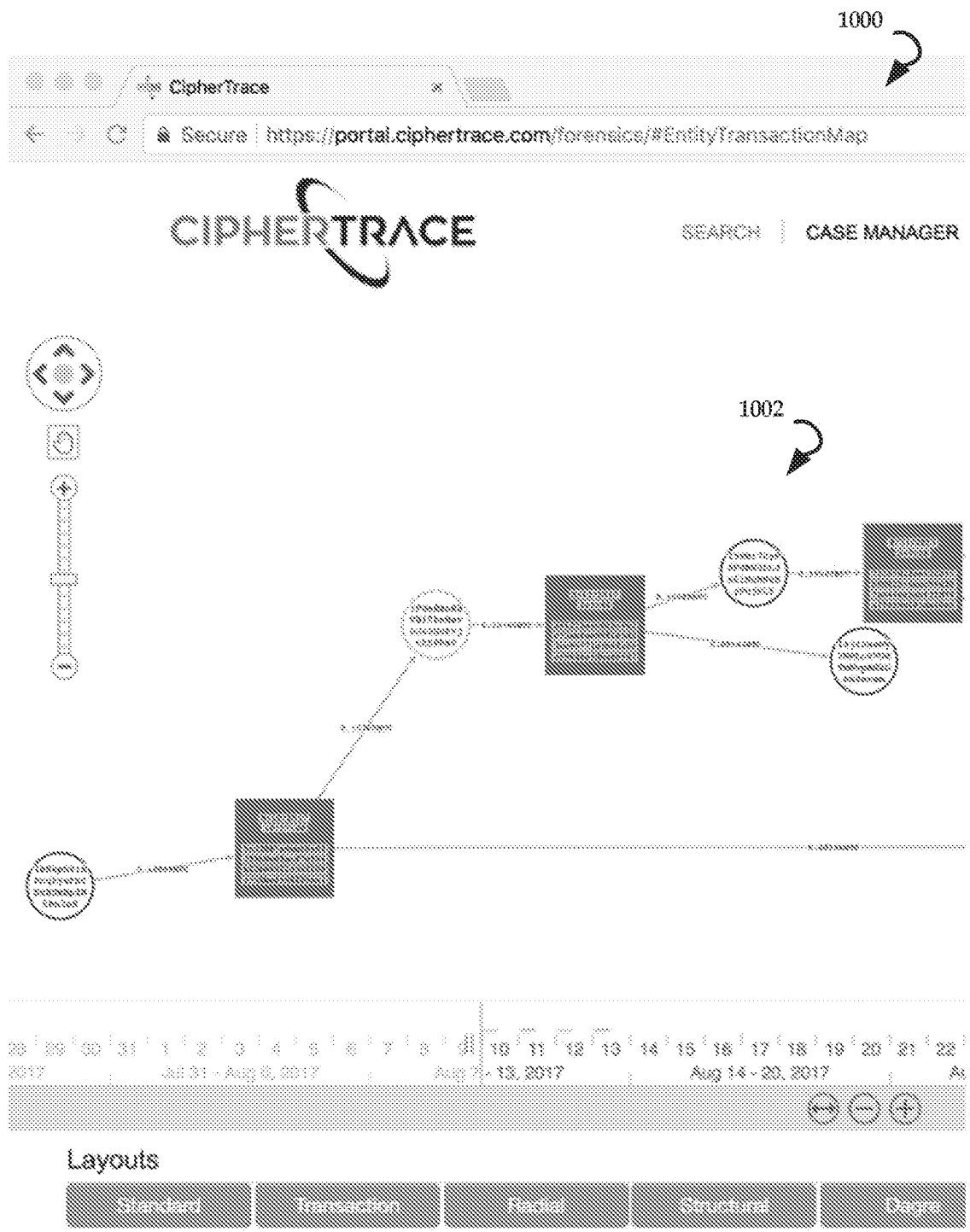
FIGS. 10A and 10B collectively illustrate a visual graphical interface that illustrates a transaction flow, also illustrating a reverse search process for identifying additional cryptocurrency addresses involved in a malware/ransomware attack.
Figure 10B:
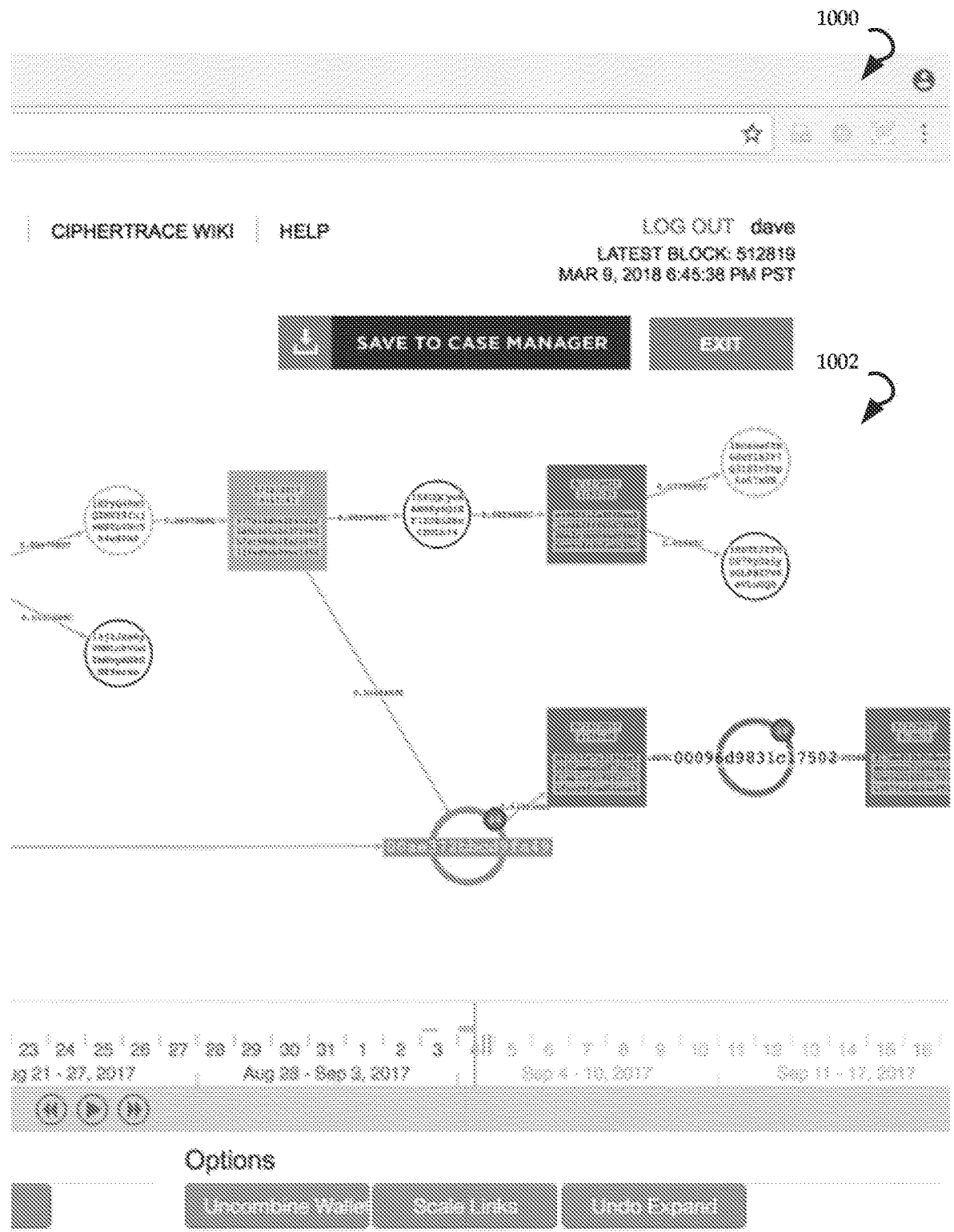
Figure 11:
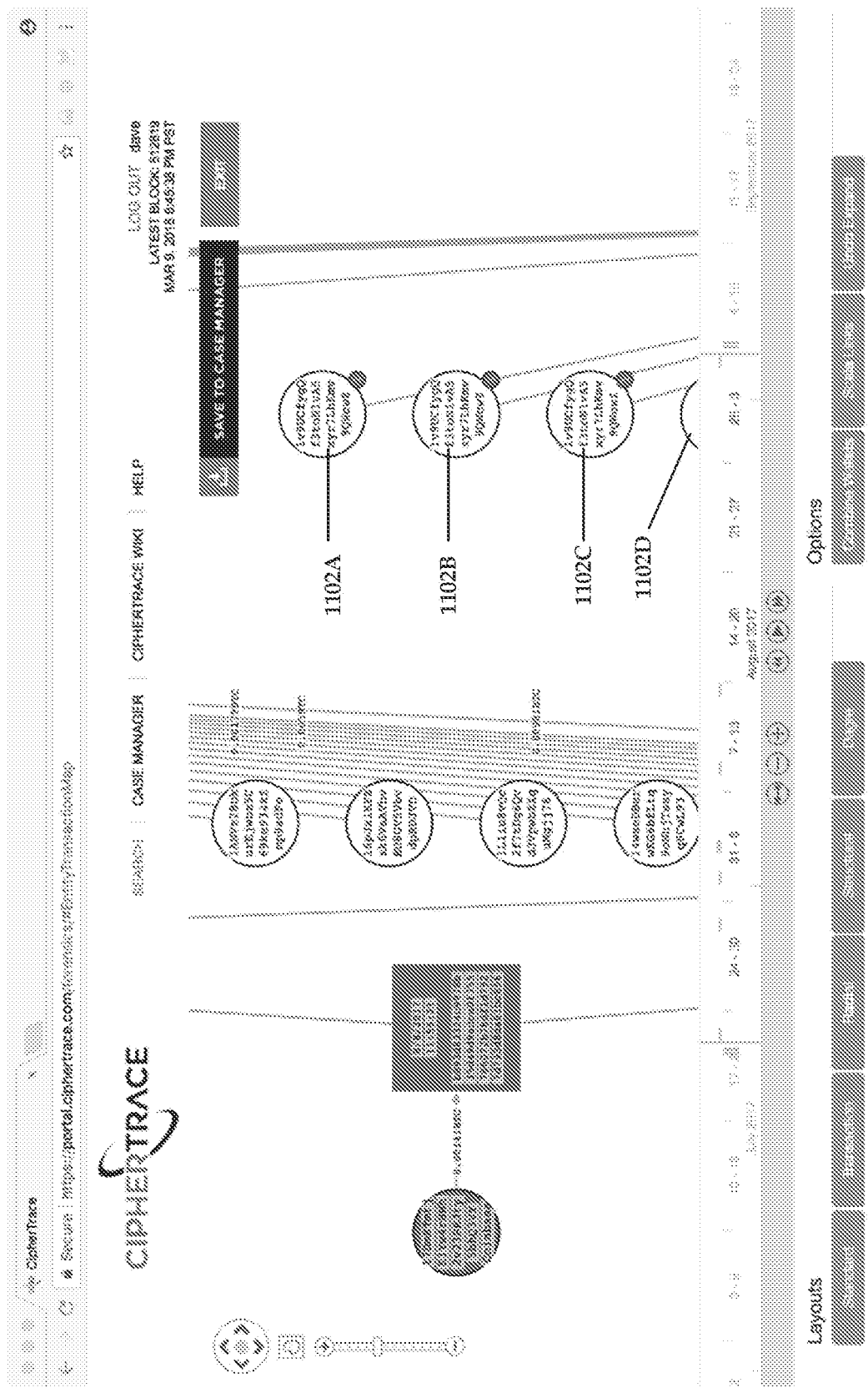
FIG. 11 visual graphical interface that illustrates a transaction flow and victims addresses.
Figure 12:
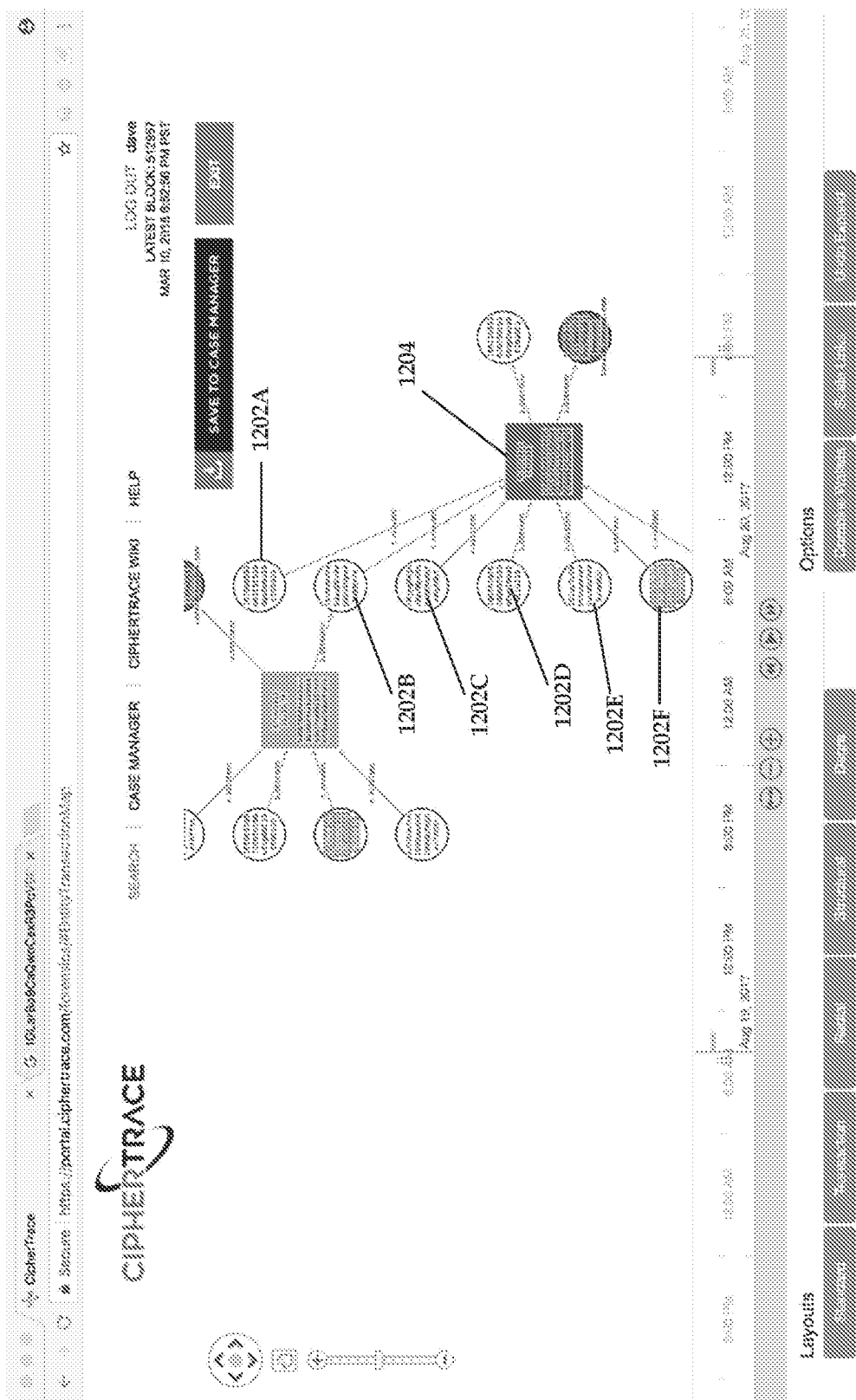
FIG. 12 illustrates connections between addresses where multiple victim addresses were transmitting cryptocurrency to a ransomware/malware address.

FIGS. 10A and 10B collectively illustrate a visual graphical interface 1000 that illustrates a transaction flow 1002, illustrating a reverse search process for identifying additional cryptocurrency addresses involved in a malware/ransomware attack. Individual victims and addresses 1102A-1102D where payments were made from are illustrated in FIG. 11, and FIG. 12 illustrates connections between addresses where multiple victim addresses 1202A-1202EF were transmitting cryptocurrency to a ransomware/malware address 1204.

Figure 13:
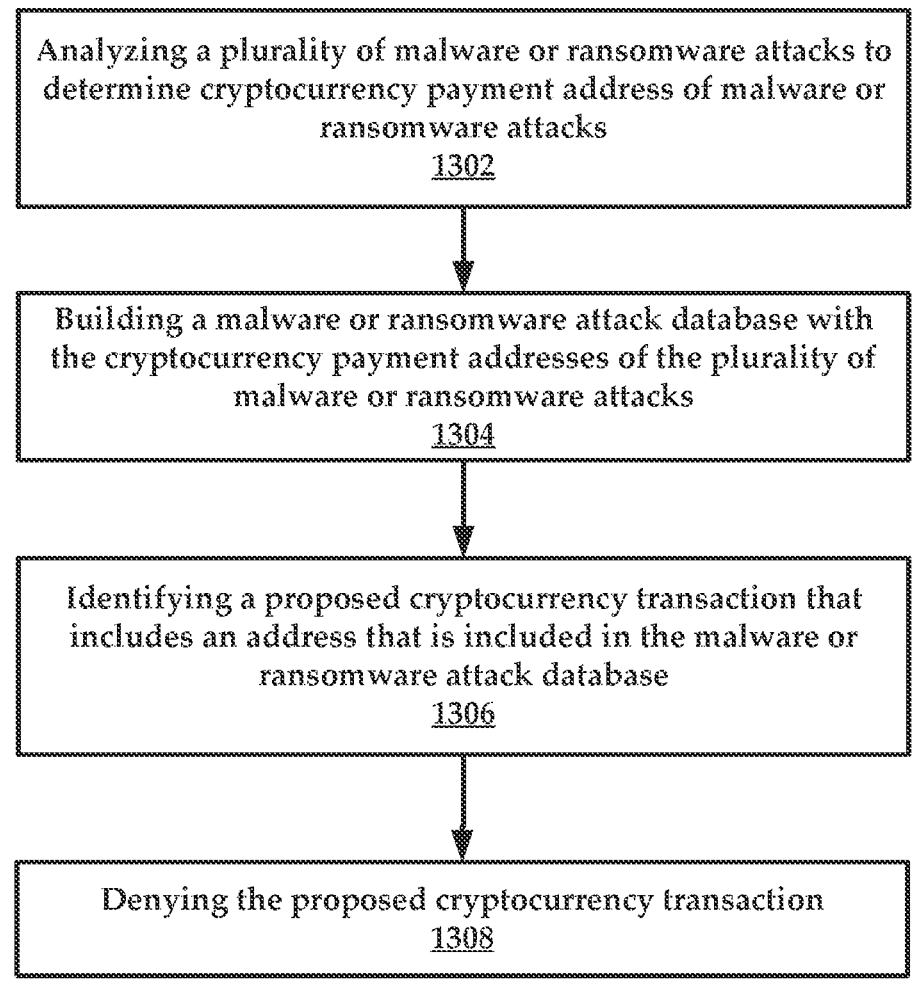
FIG. 13 is a flowchart of an example method of the present disclosure.

FIG. 13 is a flowchart of an example method of the present disclosure. The method includes an initial process of creating a malware/ransomware database that includes parameters related to a plurality of malware or ransomware attacks. When the database is created, proposed cryptocurrency transactions can be searched against this database to determine if the transaction should be approved or denied.

Thus, the method can include a step 1302 of analyzing a plurality of malware or ransomware attacks to determine cryptocurrency payment address of malware or ransomware attacks. An example method for analyzing a malware or ransomware attack is described above, and with respect to FIG. 14. The method can include a step 1304 of building a malware or ransomware attack database with the cryptocurrency payment addresses of the plurality of malware or ransomware attacks. Once the database is established, the method can include a step 1306 of identifying a proposed cryptocurrency transaction that includes an address that is included in the malware or ransomware attack database, and a step 1308 of denying the proposed cryptocurrency transaction. In some embodiments, the malware or ransomware attack database includes black and white lists of cryptocurrency addresses.

Figure 14:
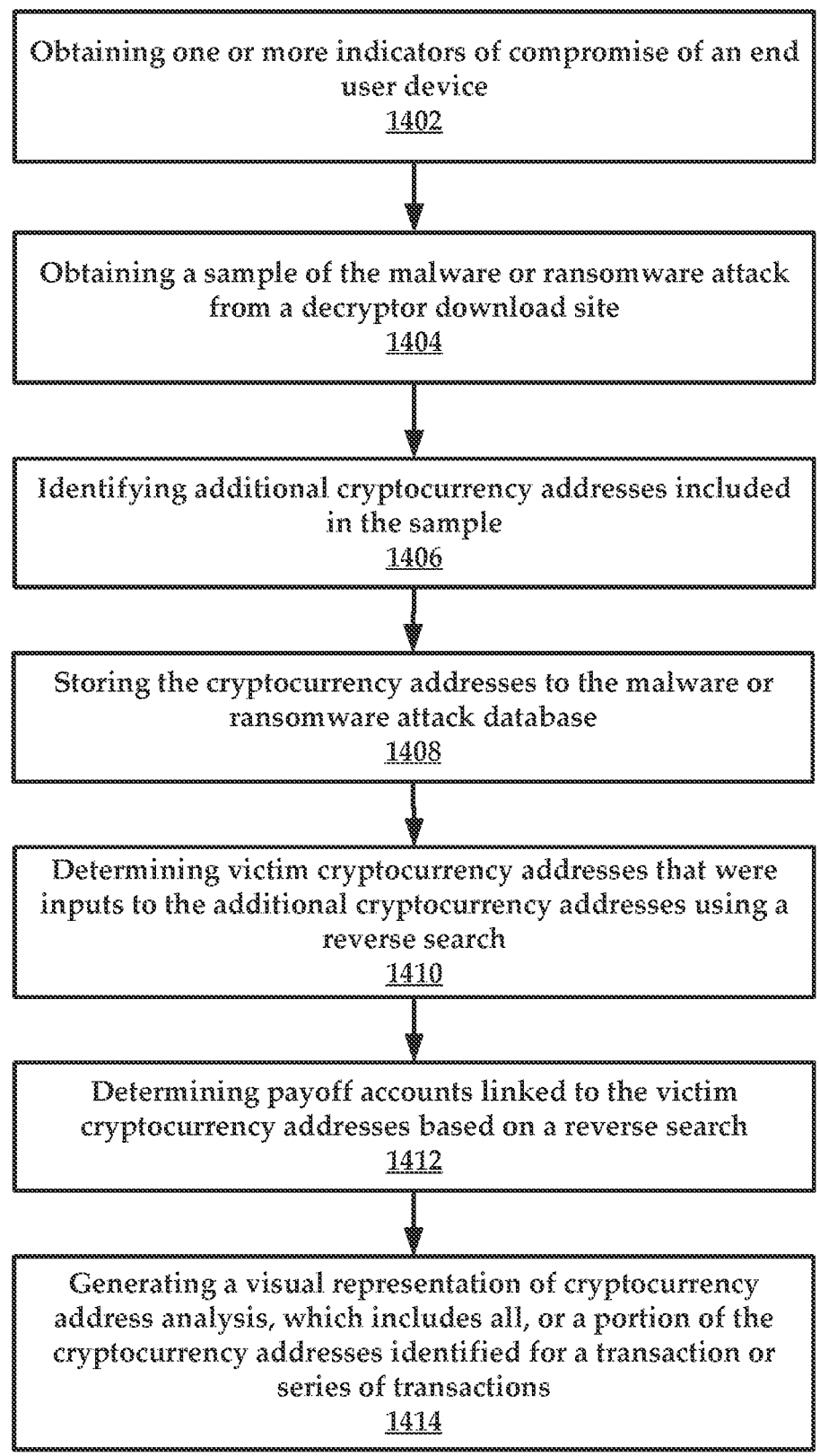
FIG. 14 is a flowchart of a method for analyzing a malware or ransomware attack.

FIG. 14 illustrates a flowchart of a method for analyzing a malware or ransomware attack. The method can include a step 1402 of obtaining one or more indicators of compromise of an end user device. The plurality of malware or ransomware attacks includes a malware or ransomware attack of the end user device. As noted above, this can include obtaining file paths, registry location, hashes, and so forth of an infected end user system.

The method includes a step 1404 of obtaining a sample of the malware or ransomware attack from a decryptor download site. This is an optional step that is performed if a sample can be obtained. In some embodiments, the method includes a step 1406 of identifying additional cryptocurrency addresses included in the sample. As illustrated in FIG. 9, the malware/ransomware code can be disassembled, and cryptocurrency addresses identified. Storing the cryptocurrency addresses to the malware or ransomware attack database in step 1408.

The method can also include a step 1410 of determining victim cryptocurrency addresses that were inputs to the additional cryptocurrency addresses using a reverse search, as well as a step 1412 of determining payoff accounts linked to the victim cryptocurrency addresses based on a reverse search. As noted above, when a cryptocurrency address has multiple inputs, it may be identified as being involved in malicious behavior, especially when that cryptocurrency address has inputs that have been linked to cryptocurrency address or IP addresses of end user devices that are reported victims of an attack.

In various embodiments, the method can include a step 1414 of generating a visual representation of cryptocurrency address analysis, which includes all, or a portion of the cryptocurrency addresses identified for a transaction or series of transactions. In some embodiments, this can include applying a clustering process to identify which of the cryptocurrency payment addresses has a plurality of inputs.

Figure 15:
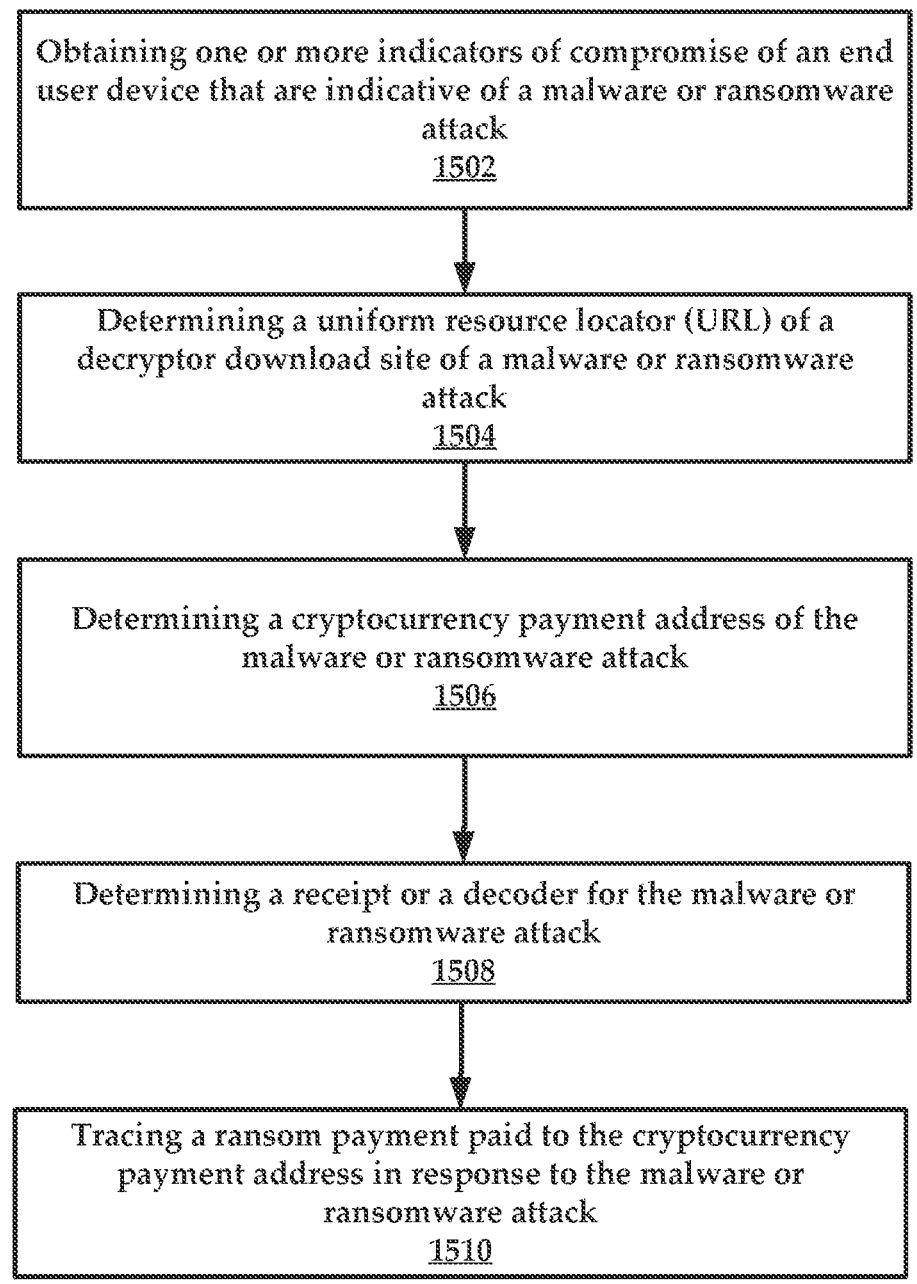
FIG. 15 a flowchart of another method for analyzing a plurality of malware or ransomware attacks

FIG. 15 is a flowchart of another method for analyzing a plurality of malware or ransomware attacks. The method can include a step 1502 of obtaining one or more indicators of compromise of an end user device that are indicative of a malware or ransomware attack. The method can further include a step 1504 of determining a uniform resource locator (URL) of a decryptor download site of a malware or ransomware attack, along with a step 1506 of determining a cryptocurrency payment address of the malware or ransomware attack and a step 1508 of determining a receipt or a decoder for the malware or ransomware attack. In various embodiments, the method can include a step 1510 of tracing a ransom payment paid to the cryptocurrency payment address in response to the malware or ransomware attack.

Figure 16:
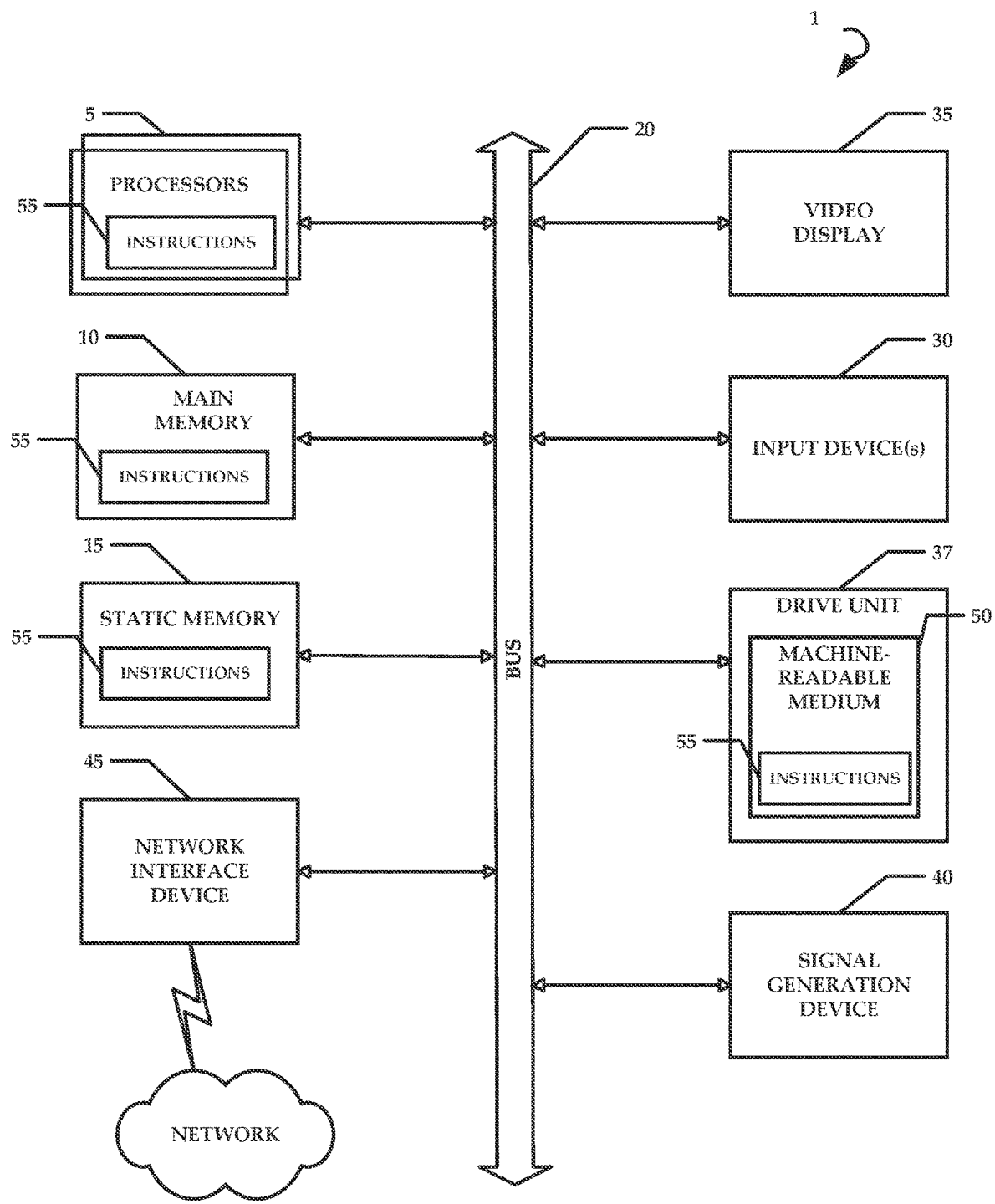
FIG. 16 illustrates an exemplary computer system that may be used to implement some or all embodiments of the system.

FIG. 16 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 100 may be implemented as a cloud-based computing environment, such as a virtual machine operating within a computing cloud. In other embodiments, the computing system 100 may itself include a cloud-based computing environment, where the functionalities of the computing system 100 are executed in a distributed fashion. Thus, the computing system 100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing device 100, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for cryptocurrency-based malware detection, the method comprising:
    analyzing a screenshot of a ransomware note displayed on an end user device, associated with a cryptocurrency-based malware or ransomware attack;
    based on the analyzing:
        identifying a uniform resource locator (URL) of a decryptor download site of the cryptocurrency-based malware or ransomware attack; and
        identifying a cryptocurrency payment address of the cryptocurrency-based malware or ransomware attack;
    identifying additional cryptocurrency addresses included in a sample code of the cryptocurrency-based malware or ransomware attack;
    storing the additional cryptocurrency addresses to a malware or ransomware attack database;
    tracing a ransom payment paid to the cryptocurrency payment address in response to the cryptocurrency-based malware or ransomware attack;
    based on the tracing of the ransom payment paid to the cryptocurrency payment address, storing the cryptocurrency payment address in the malware or ransomware attack database; and
    identifying a proposed cryptocurrency transaction that includes an address that is included in the malware or ransomware attack database.

2. The method according to claim 1, further comprising determining whether a receipt or a decoder link for the cryptocurrency-based malware or ransomware attack is available.

3. The method according to claim 2, further comprising:
    based on determining that the receipt or the decoder link is available, obtaining the sample code of the cryptocurrency-based malware or ransomware attack.

4. The method according to claim 1, further comprising blocking the identified proposed cryptocurrency transaction.

5. The method according to claim 1, further comprising assigning a risk level to the proposed cryptocurrency transaction based on an activity related to the address.

6. The method according to claim 1, further comprising alerting a cryptocurrency exchange in real-time when the proposed cryptocurrency transaction including the address is initiated.

7. The method according to claim 1, further comprising:
    finding related addresses of the address; and
    storing the related address in the malware or ransomware attack database.

8. A system, comprising:
    a processor; and
    a memory for storing instructions, the processor executing the instructions to:
        analyze a screenshot of a ransomware note displayed on an end user device, associated with a cryptocurrency-based malware or ransomware attack;
        based on the analyzing:
            identify a uniform resource locator (URL) of a decryptor download site of the cryptocurrency-based malware or ransomware attack; and
            identify a cryptocurrency payment address of the cryptocurrency-based malware or ransomware attack;
        identify additional cryptocurrency addresses included in a sample code of the cryptocurrency-based malware or ransomware attack;
        store the additional cryptocurrency addresses to a malware or ransomware attack database;
        trace a ransom payment paid to the cryptocurrency payment address in response to the cryptocurrency-based malware or ransomware attack;
        based on the tracing of the ransom payment paid to the cryptocurrency payment address, store the cryptocurrency payment address in the malware or ransomware attack database; and
        identify a proposed cryptocurrency transaction that includes an address that is included in the malware or ransomware attack database.

9. The system according to claim 8, wherein the processor further executes the instructions to determine whether a receipt or a decoder link for the cryptocurrency-based malware or ransomware attack is available.

10. The system according to claim 9, wherein the processor further executes the instructions to: based on determining that the receipt or the decoder link is available, obtain the sample code of the cryptocurrency-based malware or ransomware attack.

11. The system according to claim 8, wherein the processor further executes the instructions to block the identified proposed cryptocurrency transaction.

12. The system according to claim 8, wherein the processor further executes the instructions to assign a risk level to the proposed cryptocurrency transaction based on an activity related to the address.

13. The system according to claim 8, wherein the processor further executes the instructions to alert a cryptocurrency exchange in real-time when the proposed cryptocurrency transaction including the address is initiated.

14. The system according to claim 8, wherein the processor further executes the instructions to:
   find related addresses of the address; and
   store the related address in the malware or ransomware attack database.

15. A method for cryptocurrency-based malware detection, the method comprising:
   analyzing a screenshot of a ransomware note displayed on an end user device, associated with a cryptocurrency-based malware or ransomware attack;
   based on the analyzing, identifying a cryptocurrency payment address of the cryptocurrency-based malware or ransomware attack;
   identifying additional cryptocurrency addresses included in a sample code of the cryptocurrency-based malware or ransomware attack;
   storing the additional cryptocurrency addresses to a malware or ransomware attack database;
   tracing a ransom payment paid to the cryptocurrency payment address in response to the cryptocurrency-based malware or ransomware attack;
   based on the tracing of the ransom payment paid to the cryptocurrency payment address, storing the cryptocurrency payment address in the malware or ransomware attack database;
   identifying a proposed cryptocurrency transaction that includes an address that is included in the malware or ransomware attack database; and
   denying the proposed cryptocurrency transaction.

16. The method according to claim 15, further comprising determining whether a receipt or a decoder link for the cryptocurrency-based malware or ransomware attack is available.

17. The method according to claim 16, further comprising:
   based on determining that the receipt or the decoder link is available, obtaining the sample code of the cryptocurrency-based malware or ransomware attack.

18. The method according to claim 15, further comprising blocking the identified proposed cryptocurrency transaction.

19. The method according to claim 15, further comprising assigning a risk level to the proposed cryptocurrency transaction based on an activity related to the address.

20. The method according to claim 15, further comprising alerting a cryptocurrency exchange in real-time when the proposed cryptocurrency transaction including the address is initiated.

* * * * *